United States Patent
Verdooner et al.

(10) Patent No.: US 10,856,071 B2
(45) Date of Patent: Dec. 1, 2020

(54) SYSTEM AND METHOD FOR IMPROVING HEARING

(71) Applicant: NOOPL, INC., Sacramento, CA (US)

(72) Inventors: Steven Verdooner, Sacramento, CA (US); Rodney Sparks, Antelope, CA (US); Kevin Snow, Granite Bay, CA (US)

(73) Assignee: Noopl, Inc., Sacramento, CA (US)

( * ) Notice: Subject to any disclaimer, the term of this patent is extended or adjusted under 35 U.S.C. 154(b) by 111 days.

(21) Appl. No.: 15/045,199

(22) Filed: Feb. 16, 2016

(65) Prior Publication Data
US 2016/0249141 A1 Aug. 25, 2016

Related U.S. Application Data

(60) Provisional application No. 62/116,231, filed on Feb. 13, 2015.

(51) Int. Cl.
*H04R 1/40* (2006.01)
*H04R 3/00* (2006.01)
(Continued)

(52) U.S. Cl.
CPC ......... *H04R 1/406* (2013.01); *G06K 9/00255* (2013.01); *G06K 9/22* (2013.01); *G10L 21/02* (2013.01); *H04R 3/005* (2013.01); *H04S 7/303* (2013.01); *G10L 2021/02166* (2013.01); *H04R 25/407* (2013.01); *H04R 2201/401* (2013.01); *H04R 2225/43* (2013.01); *H04R 2225/55* (2013.01); *H04R 2225/61* (2013.01);
(Continued)

(58) Field of Classification Search
CPC .. H04R 25/606; H04R 1/406; G06K 9/00255; G06K 9/22
See application file for complete search history.

(56) References Cited

U.S. PATENT DOCUMENTS 8,301,193 B1 10/2012 Lynch et al.
8,755,547 B2 6/2014 Mejia et al.
(Continued)

FOREIGN PATENT DOCUMENTS

WO 2014119835 A1 8/2014

OTHER PUBLICATIONS

International Search Report and the Written Opinion of the International Searching Authority for PCT/US2016/018132, dated Apr. 11, 2016.
(Continued)

*Primary Examiner* — Mohammad K Islam
(74) *Attorney, Agent, or Firm* — Lucas & Mercanti, LLP

(57) ABSTRACT

A system and method for improving hearing is disclosed. The system includes a microphone array that includes an enclosure, a plurality of beamformer microphones and an electronic processing circuitry to provide enhanced audio signals to a user by using information obtained on the position and orientation of the user. The system is preferably in the form of a smartphone having a retractable piece having the beamformer microphones mounted thereon. The system may also include a corresponding method for improving hearing and a non-transitory computer storage media having instructions stored thereon which, when executed, execute the method.

62 Claims, 30 Drawing Sheets

(51) Int. Cl.
*G10L 21/02* (2013.01)
*G06K 9/00* (2006.01)
*G06K 9/22* (2006.01)
*H04S 7/00* (2006.01)
*H04R 25/00* (2006.01)
*G10L 21/0216* (2013.01)

(52) U.S. Cl.
CPC ...... *H04R 2410/01* (2013.01); *H04R 2420/07* (2013.01); *H04R 2430/20* (2013.01); *H04R 2430/23* (2013.01); *H04S 2420/01* (2013.01)

(56) References Cited

U.S. PATENT DOCUMENTS

| | | | |
|---|---|---|---|
| 8,891,800 B1 | 11/2014 | Shaffer | |
| 8,947,978 B2 | 2/2015 | Mejia | |
| 8,953,817 B2 | 2/2015 | Mejia et al. | |
| 9,473,841 B2* | 10/2016 | Nugent | H04R 1/08 |
| 9,596,437 B2* | 3/2017 | Zad Issa | H04N 7/18 |
| 2008/0037800 A1 | 2/2008 | Grasfield | |
| 2008/0063228 A1 | 3/2008 | Mejia et al. | |
| 2009/0002476 A1 | 1/2009 | Cutler | |
| 2010/0026780 A1 | 2/2010 | Tico et al. | |
| 2010/0177178 A1 | 7/2010 | Burns | |
| 2010/0317413 A1 | 12/2010 | Tan | |
| 2011/0200215 A1* | 8/2011 | Apfel | H04R 25/70 381/314 |
| 2011/0249839 A1* | 10/2011 | Mindlin | H04R 25/43 381/314 |
| 2011/0298348 A1* | 12/2011 | Hu | H04M 1/0237 312/319.1 |
| 2012/0163625 A1 | 6/2012 | Siotis | |
| 2013/0028443 A1* | 1/2013 | Pance | G06F 3/167 381/107 |
| 2013/0107028 A1 | 5/2013 | Gleiner et al. | |
| 2013/0170120 A1 | 7/2013 | Richardson | |
| 2013/0177166 A1* | 7/2013 | Agevik | H04S 1/005 381/74 |
| 2013/0188102 A1 | 7/2013 | DeCusatis | |
| 2013/0223644 A1 | 8/2013 | Van Hoesel et al. | |
| 2013/0223660 A1 | 8/2013 | Olafsson | |
| 2013/0300648 A1 | 11/2013 | Kim et al. | |
| 2014/0029778 A1* | 1/2014 | Bartunek | H04R 25/30 381/317 |
| 2014/0188848 A1* | 7/2014 | Waldman | G06F 3/04842 707/722 |
| 2014/0337023 A1 | 11/2014 | McCulloch | |
| 2014/0347265 A1* | 11/2014 | Aimone | G09G 3/003 345/156 |
| 2014/0369537 A1 | 12/2014 | Pontoppidan et al. | |
| 2015/0117695 A1* | 4/2015 | Barrentine | H04R 1/105 381/380 |
| 2015/0121347 A1* | 4/2015 | Petit | G06F 17/5009 717/126 |
| 2015/0296289 A1* | 10/2015 | Lakkundi | H04R 3/005 381/92 |
| 2015/0358579 A1 | 12/2015 | Shin | |
| 2015/0382129 A1* | 12/2015 | Florencio | H04S 7/303 381/303 |
| 2016/0005417 A1 | 1/2016 | Van Hoesel et al. | |
| 2016/0381459 A1* | 12/2016 | Baca | H04R 5/04 386/227 |
| 2017/0068091 A1* | 3/2017 | Greenberg | G06F 3/013 |
| 2017/0243582 A1* | 8/2017 | Menezes | G10L 15/26 |

OTHER PUBLICATIONS

Extended European Search Report for copending Application No. 16750075.0 based on PCT/US2016/018132, dated Sep. 4, 2018.
Examination report No. 1 for standard patent application, Australian Patent Application No. 2016218989, dated Sep. 4, 2019.
Communication pursuant to Article 94(3) EPC, European Patent Application No. 16750075.0-1210, dated Jul. 3, 2019.

* cited by examiner

SYSTEM AND METHOD FOR IMPROVING HEARING

CROSS-REFERENCE TO RELATED APPLICATIONS

This application claims priority to U.S. Provisional Application Ser. No. 62/116,231 filed on Feb. 13, 2015, the entire disclosure of which is incorporated by reference.

BACKGROUND OF THE INVENTION

Field of the Invention

The present invention generally relates to a system and method for hearing. More specifically, the present invention is a system and method for improving hearing.

Description of the Related Art

While hearing aids perform well in certain environments, location of microphones on the hearing aid is not in an optimal position to take full advantage of directional microphones and noise cancellation. Furthermore, hearing aids must make efficient use of power and battery life and therefore cannot be fully optimized to capitalize on real-time noise cancellation amplification, and other audio enhancements. Additionally, noisy environments such as restaurants provide additional challenges of noise bouncing off of hard surfaces and changing directions.

SUMMARY OF THE INVENTION

It is an object of the present invention to provide a system and method for improving hearing that improves hearing for individuals with hearing loss.

It is an object of the present invention to provide a system and method for improving hearing that augments the audio area of interest by determining head position and/or gaze.

It is an object of the present invention to provide a system and method for improving hearing that contains a small microprocessor to perform said functions of analysis of location awareness, head or gaze tracking, selection of microphone combination, angle and strength, sound amplification and noise cancellation.

As used herein, unless otherwise indicated, the term "user" refers to a "listening user", inasmuch as the invention is directed to improving the hearing for individuals.

It is an object of the present invention to provide a system and method for improving hearing that said functionality is contained in a case that is held in the hand.

It is an object of the present invention to provide a system and method for improving hearing that device sits on a table, or has a kickstand with rubberized foot so that it may be used hand-held or erected to stand up on a surface such as a desk. The processing circuit can optimize at least one of the direction, strength, angle, and quality of the audio output signals. The processing circuit can comprise an amplifier to amplify the microphone output signals. The invention provides a system for improving hearing, comprising: a plurality of microphones to receive acoustic signals from outside the enclosure and to produce microphone output signals; a user position processing circuit which receives information on the location of the user and computes the position of the user's head; a processing circuit which receives the microphone output signals and information on the position of the user's head, and produces audio output signals which are enhanced in acoustic sound quality relative to the acoustic signals received by the microphones; and an assistive hearing device to provide audio output signals to a user. The user position processing circuit may include a camera with a field of view to capture an optical image of the user's head; and a position processing circuit which computes the position and gaze orientation of the user's head; wherein the position and gaze orientation is received by the processing circuit to optimize at least one of the direction, strength, angle, and quality of the audio output signals. The audio processing circuit can output audio signals tuned to a hearing deficit profile of the user.

It is an object of the present invention to provide a system and method for improving hearing that the system is configured with parametric speakers that may be directed at the left and/or right ears.

It is an object of the present invention to provide a system and method for improving hearing that the sound puck streams audio to external speakers, external parametric speakers, the smartphone itself (with or without ear buds), hearing aids, assistive hearing devices, BLUETOOTH® headsets, cochlear implants, headphones, or any other device used to hear or enhance hearing.

It is an object of the present invention to provide a system and method for improving hearing that the system could be used with a multi camera equipped smartphone and integrated with its gaze tracking capability to achieve same sound enhancement objectives listed above.

It is an object of the present invention to provide a system and method for improving hearing that is a tablet, watch or body worn device. The watch may be a smart watch.

It is an object of the present invention to provide a system and method for improving hearing that is a dedicated device to achieve same objectives of gaze tracking enhanced sound amplification from microphone array but with a dedicated device that is not a smartphone or tablet.

It is an object of the present invention to provide a system and method for improving hearing that may be driven by a variety of sources other than the sound puck or IHOLDER®, device.

It is an object of the present invention to provide a system and method for improving hearing that the audio is recorded for delayed or repeated playback. Thus, delayed output of audio can be a notification to the user. An audio storage medium can store the signals for delayed or repeated playback. The audio signals can be audio playing of additional notifications not part of the acoustic signals received by the microphones.

It is an object of the present invention to provide a system and method for improving hearing that the parameters to further enhance sound and to play notifications are controlled on the device itself, on the smartphone or tablet, by touch input, or specific gaze actions, or other gestures of the user. As such, a sensor can detect gestures of a user, and output control signals to control a characteristic of audio output signals, such as volume. For example to increase volume, one could quickly look up, to decrease volume look down quickly. To play a notification one could simply have an extended gaze at the phone, or perform another gesture such as waving a finger or hand, snapping of fingers, or tilting his head. The sensor can thus detect a prolonged extended gaze gesture of the user, and the detection of prolonged gaze gesture activates a notification to the user.

It is an object of the present invention to provide a system and method for improving hearing that the parameters to further enhance sound and to play notifications are controlled by an earbud equipped with sensor for sensing a body vital sign such as EEG with an EEG sensor, processor, and subsequent transmission to smartphone or other processor/device for control of functions and activation of the playing of notifications. For example, to play a notification one could simply have a pre-programmed EEG signal that activates the playing of notifications on a smartphone.

It is an object of the present invention to provide a system and method for improving hearing that gaze tracking is achieved by eye or head position alone, or head position sensors located in the earbud, detected, and used to optimize directional or to drive beamformer microphone algorithm and noise cancellation.

It is an object of the present invention to provide a system and method for improving hearing that the IHOLDER® device or sound puck is also used to charge the phone and earbud, by means of a power recharging circuit.

It is an object of the present invention to provide a case or enclosure that provides; decoupling the microphones from the case with foam; filling the case with mouldable plastic; and inserting a layer of absorptive foam inside the cavity.

The invention provides a system and method which addresses problems of the above described hearing aids in a number of ways. First a microphone array having a plurality of directional or beamformer microphones which may be inserted into an enclosure and placed in a more optimal position. Once such example would be directly in front of a hearing impaired individual on the table of a restaurant. The enclosure could take many forms and could accommodate a small or large array of directional or beamformer microphones. To process the audio input from the microphone, the enclosure could contain more powerful processing circuit than potentially possible with hearing aids as it could be externally powered or more optimally powered by a battery, or a cell phone with a processor or a smartphone battery from an attached smartphone (like a smartphone table-top holder). The device could either use electronics contained in the device itself including BLUETOOTH® protocol devices and other wireless communication protocols, or it could take advantage of any one or more of the functions built into the smartphone such as processing, power, battery, graphics processing unit or GPU, camera, BLUETOOTH® device, and other smartphone functionality such as a gyroscope and an accelerometer for position detection. The sound puck can be in the form of a tabletop device which has a storage location and recharge port for storing and charging an earbud. The plurality of microphones and processing circuit may be in the form of a conference puck having webcams incorporated in an enclosure and conference telephone and video conferencing capability. The conference puck may include a webcam which detects the location of the user and active speaker. The device may include a mirror adapted to point at the user's head so that the device can lay flat on a horizontal surface. The device may be in the form of an electronic tablet or body worn device.

If a smartphone were utilized on top of the enclosure, and the smartphone was angled-up towards the user, (or directed upward via a mirror that was part of the enclosure), one could utilize the built-in camera (or a camera built into the enclosure) itself to monitor the user's head position and gaze. Thus, the device has a camera with a field of view to capture an optical image of a user's head. Knowing the gaze and head position could help guide a sound processing algorithm and optimize directional microphone selection, beamformer algorithm, and processing. Additionally, an earbud that contains sensors to determine head position could also augment microphone directionality or guide a beamformer algorithm to the desired person/audio of interest. The soundpuck could collect with any wired and/or BLUETOOTH® equipped hearing device including hearing aids, assistive hearing devices, headphones, ear buds, cochlear implants, or bone-conduction devices. In one embodiment gaze tracking would not be necessary and head position would be determined by equipping hearing aids, headphones, ear buds, or bone-conduction devices with a gyroscope and/or accelerometer to detect head motion, hence augmenting the ability to determine which microphones would be optimal for active listening. The soundpuck as a tabletop device can contain a plurality of microphones, user position processing circuit and audio transmitter. This could be done by pairing with the sensors that are part of the microphone array and/or part of the microphone assembly and/or sensors contained in the smartphone. This could be paired with a particular smartphone sitting on the table to determine head positions. In another embodiment the same listening devices are equipped with a circuit that can detect a gesture such as a vibration, hence allowing the user to effectively "click" by tapping the device or temple of the glasses with one's finger. Multiple tap codes could send different messages and/or actions. In another embodiment a bone conduction "speaker" attaches to the back part of the temple of glasses, behind the ear and out of view. In this embodiment the bone conduction device could slide onto the back of the glasses and contain a comfortable foam exterior.

The output from the "sound puck or IHOLDER® device and smartphone could be sent via BLUETOOTH® protocol or other wireless protocol to a wireless equipped hearing aid, assistive hearing device, BLUETOOTH® protocol headset, earbuds, headphones, bone conduction hearing device, or cochlear implants. The ability to utilize a directional microphone array may be combined with head gaze tracking driven augmentation to determine gaze for an audio area of interest. A directional and/or beamforming microphone array combined with head and/or gaze tracking, and/or gyroscope/accelerometer equipped augmentation can be used to determine head position for audio area of interest. Behind the ear hidden bone and/or cartilage conduction speakers that attach to skin or glasses temple. Tap vibration sensing can be used to mimic mouse clicks or touch actions. Specific gaze gestures can be used to mimic touch actions. The audio may be recorded for repeated playback, or playback of x seconds (Tivo like). Said playback could be initiated via detection of a gesture such as a tap on the device or the temple of glasses, or a prolonged gaze at a camera on a smartphone. The accelerometer and gyroscope are used for motion tracking, sleep tracking and may contain sensors for (but not limited to) ECG, temperature, and skin moisture. Small bone conduction speakers ("bone conduction device") can mount behind the ear against the mastoid process (or any bone location around the ear), or against the cartilage behind the ear. They could be standalone, adhering to skin or back of ear, and or be mounted to and/or slid over the back temple of glasses behind the ear is paired with the other sound puck device. These may contain foam for comfort and would be universal to interface with a variety of glasses styles. These devices could contain one or more sensors for determining head position to augment microphone selection and sound optimization. These could include any combination of gyroscope and/or accelerometer. These devices could also be used for Fitbit-like measurement of activity, sleep tracking, etc. and/or could contain other sensors to measure temperature, skin moisture, and/or ECG. A microprojector can be incorporated into the design. A projector can reside behind the ear and connect with a light pipe that goes along the temple of glasses and then projects the desired image and/or text to the surface of the user's eye glasses and then through the pupil and into the eye. This could be accomplished with or without a beam splitter coating on the eye glasses. This would allow viewing of images and text through the glasses and also of the desired scene. The mechanism would be hidden from view in one embodiment. A beamsplitter could be accomplished with specific glass lens, coating, and/or plastic overlay for glasses.

The present invention also provides a system for improving hearing which includes a server system with a processor system, a communications interface, a communications system, an input system and an output system, the server system having access to a communications network, a memory system with an operating system, a communications module, a web browser module and an improving hearing non-transitory storage medium for storing applications software for processing information representing audio signals obtained from a plurality of microphones to enhance the sound quality of the audio signals, and transmitting the enhanced and a website displaying the improving hearing information that resides on the improving hearing non-transitory storage medium, wherein the output system and communications system transmit the enhanced audio signals to a user.

The present invention provides a method for improving hearing which includes the steps of obtaining audio signals from a plurality of microphones, transmitting information representing the audio signals over a communications system through a communication interface to a server, processing the transmitted information to enhance the sound quality of the audio signals and transmitting the enhanced audio signals to a user.

BRIEF DESCRIPTION OF THE DRAWINGS

The present invention will be described by way of exemplary and non-limiting embodiments, illustrated in the accompanying drawings in which like reference numerals denote similar elements, and in which.

DETAILED DESCRIPTION OF THE INVENTION

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention. However the order of description should not be construed as to imply that these operations are necessarily order dependent. In particular, these operations need not be performed in the order of presentation.

The phrase "in one embodiment" may or may not refer to the same embodiment. The terms "comprising", "having" and "including" are synonymous, unless the context dictates otherwise.

Figure 1A:
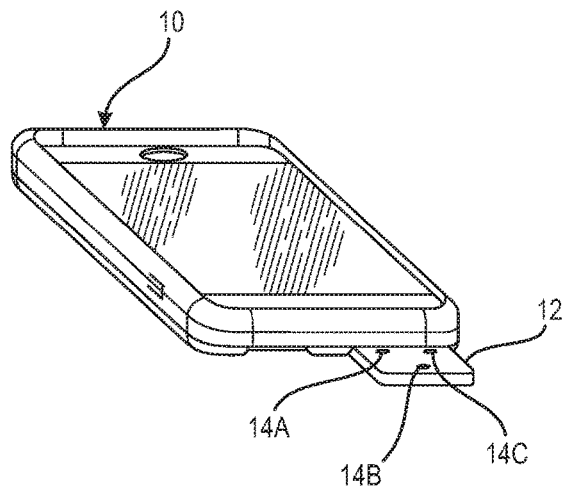
FIG. 1A is a perspective view of an embodiment of the invention in the form of an enhanced smartphone with an extension piece which carries three microphones.
Figure 1B:
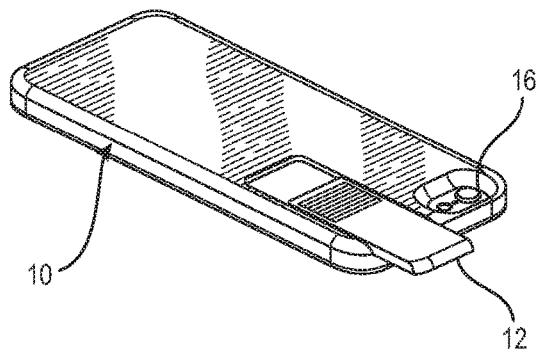
FIG. 1B is a different perspective view of the embodiment of FIG. 1A, showing the extension piece extended from the enhanced smartphone.
Figure 1C:
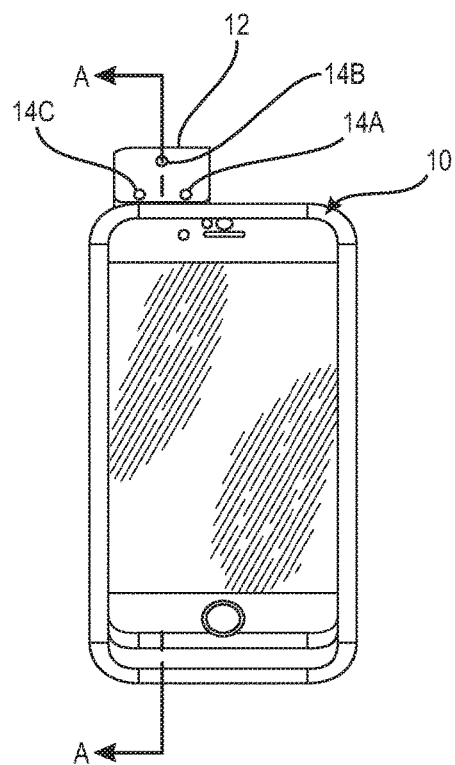
FIG. 1C is a front elevational view of the enhanced smartphone of FIG. 1A.
Figure 1E:
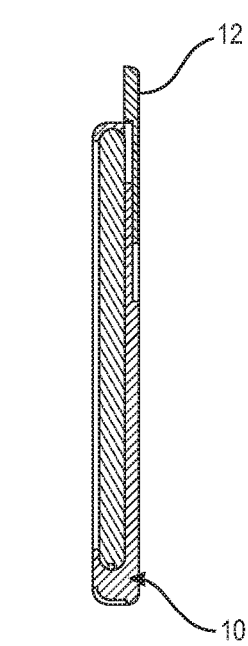
FIG. 1E is a cross-section side view of the embodiment of FIG. 1A-1D, taken along section A-A of FIG. 1C.
Figure 1D:
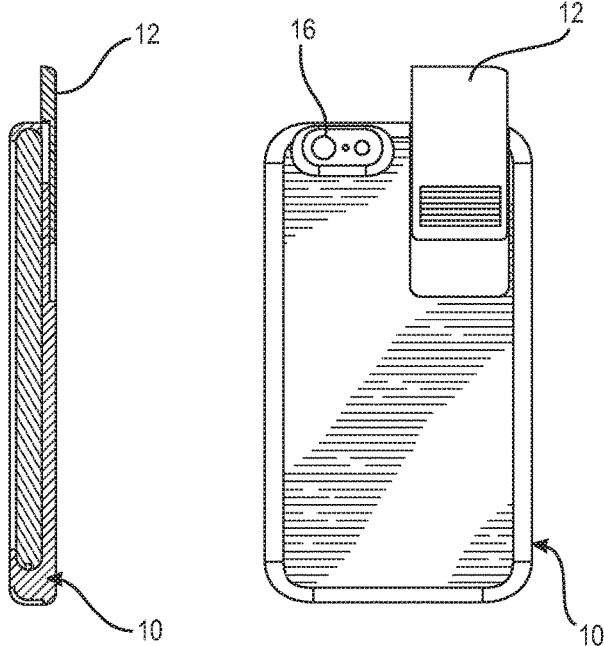
FIG. 1D is a rear elevational view of the enhanced smartphone.

FIGS. 1A-1E show an embodiment of the invention in the form of an enhanced modified smartphone. FIG. 1A shows a perspective view of a smartphone 10 modified and enhanced to include a sliding extension piece 12 having three microphones 14A, 14B and 14C which are exposed when the extension piece 12 is extended. The extension piece is slidably mounted on the underside of the device as shown in FIGS. 1A-1E and is in the form of a flat rectangular piece on which the three microphones are mounted in fixed position and in a non-collinear relationship relative to each other and are exposed when a leading portion of the sliding piece extends from an edge of the device and remain in their fixed relative position when extended. When the extension piece 12 is retracted, the microphones 14A, 14B and 14C will be retracted and protected from exposure. As such, the plurality of microphones are located on extendable and retractable extension piece which can extend and retract from the smartphone. The smartphone 10 has a camera 16 for obtaining optical images, including the optical image of a user. The camera can be located at other positions on the smartphone. In the particular embodiment of FIGS. 1A-1E, the microphones are beamformer microphones, where operation will be discussed below.

Figure 2:
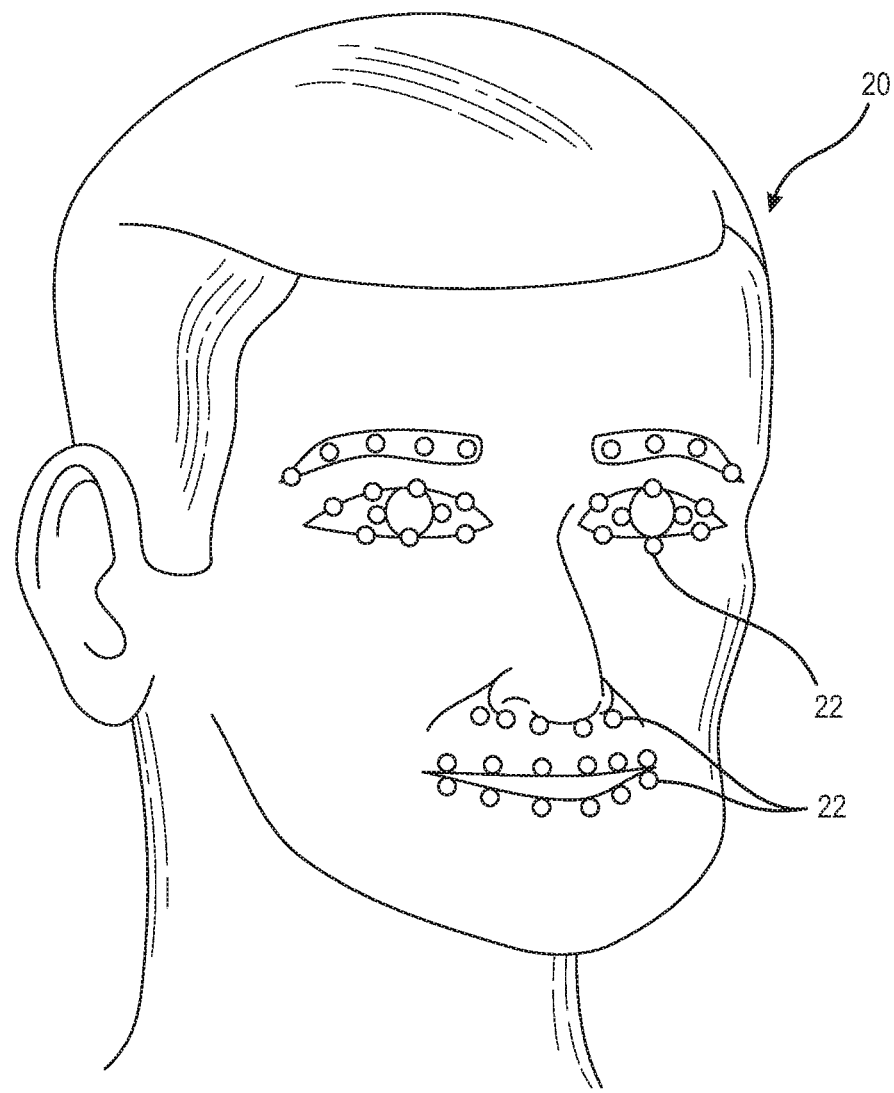
FIG. 2 is a perspective view of an optical image of a user obtained with an optical camera with reference dots used to locate the users eyes and other head features.

FIG. 2 shows an image obtained from a user when the smartphone is at a position relative to the user, along with reference points shown in dots, which dots are used to locate the user's eyes and other head features. The algorithm used to locate the user's facial features from a user's optical image of the head can be any known algorithm. Here, the yaw, pitch, and roll parameters obtained from the algorithm are shown having the values yaw=−34.2°, pitch=11.0° and roll=10.3° relative to a reference coordinate system. Other ways of locating the user's head position can include using a webcam in sound puck, embedding a position location device in an earbud, or embedding a position location device in eyeglasses, for example. Of course, other ways of locating the user's head will occur to those skilled in the art, and the invention is not limited to the ways described herein.

Figure 3:
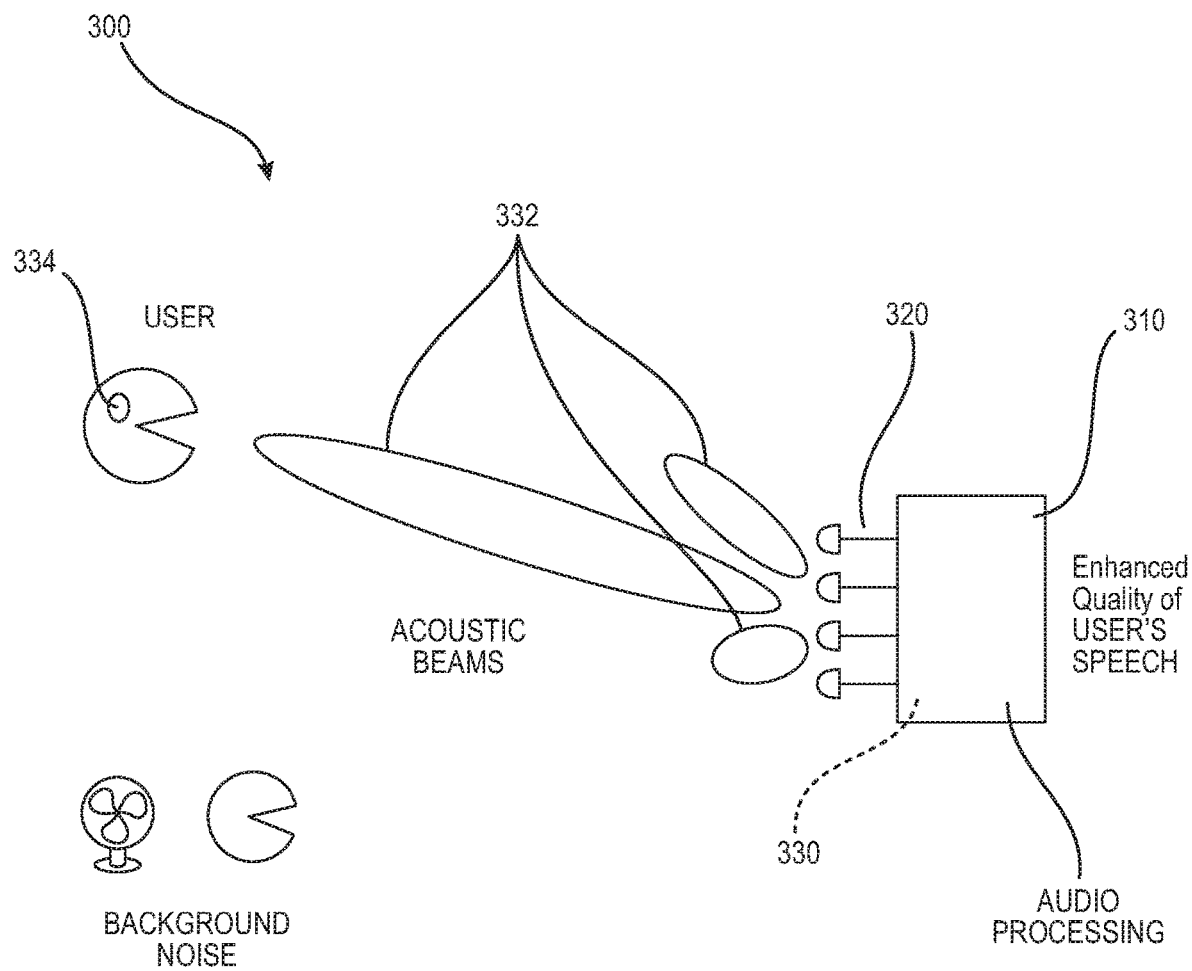
FIG. 3 illustrates a microphone array, in accordance with one embodiment of the present invention.

FIG. 3, to be described in more detail below shows in a plan view how the acoustic beam of a plurality of beamformer microphones (in FIG. 3, four such microphones) could be defined based on an algorithm using information on the position of a talking user 334 relative to the microphone locations. In this case, one of the beamformer microphones has a defined acoustic beam region 332 larger and oriented toward the talking user to capture the talking user's voice, and to optimize capturing the audio of interest, compared to background noise of which one example is shown in the bottom left of the FIG. The audio processing circuitry 330 in device 310 defines the acoustic beamformer.

The capturing of the acoustic signals of interest can be accomplished by beamformer microphones, or by directional microphones. In the case of beamformer microphones, data regarding the position and orientation of a user will be used to define the beamformer pattern of the beamformer microphones to enhance the acoustic signal provided to a user's hearing by signal processing algorithms.

Figure 4:
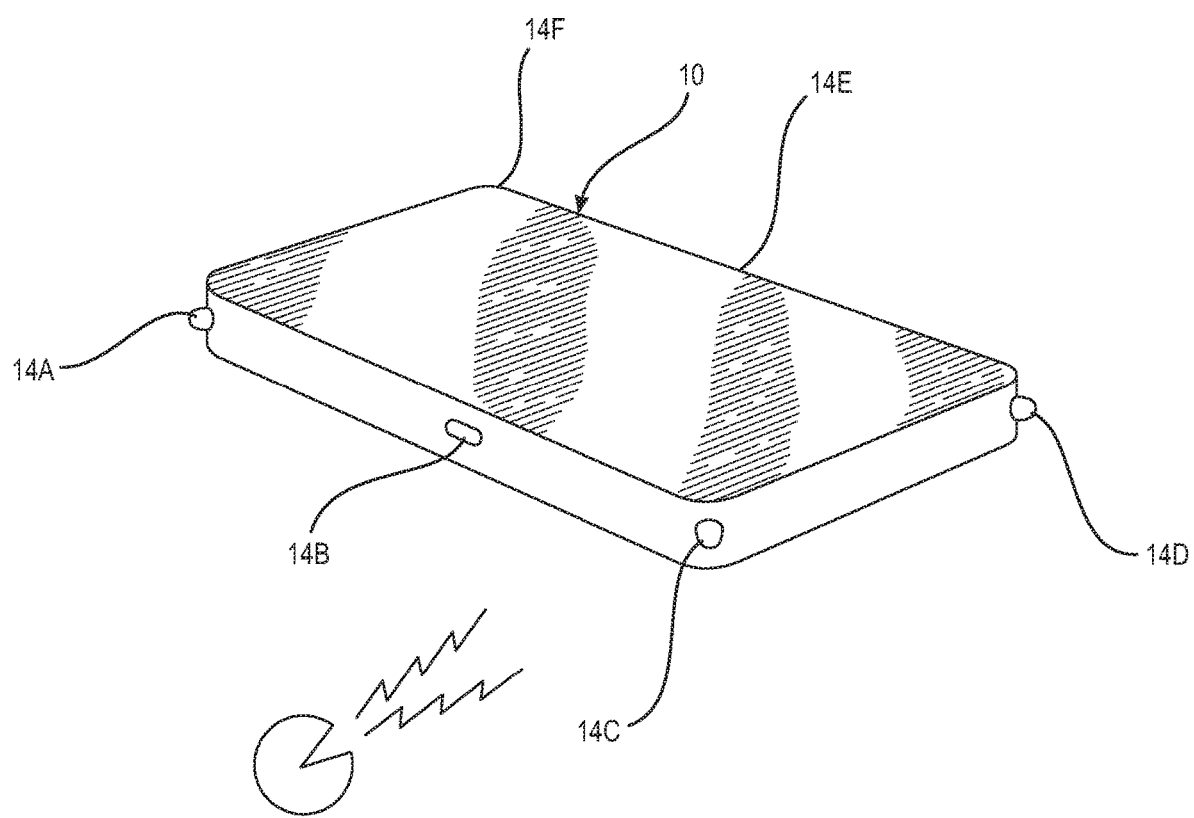
FIG. 4 is a perspective view of a smartphone showing directional microphones.

In the case of directional microphones, a plurality of directional microphones are provided, which may be provided in an array, and one or more of the microphones are selected to provide the desired acoustic signal to enhance the signal and minimize noise or other undesired sound. One example of an embodiment with directional microphones is shown in FIG. 4 which shows a smartphone having a total of six directional microphones, 14A, 141B, 14C, 14D, 14E, 14F, arranged with one microphone on each corner (14A, 14C, 14D and 14F) and one microphone on each long side of smartphone 10 (see 14B, 14E). Depending on the position of the user, one or more of the directional microphones will be enabled to optimize reception of the desired acoustic signal, while disabling the other microphones which would contribute noise. If the desired acoustic signal is from the bottom left as shown in the FIG. 4, one or both of directional microphones 14B and 14C would be enabled, which the reminder disabled. The contribution of the enabled microphones could be adjusted to enable one microphone to contribute more than the other using standard mixing techniques.

FIG. 3 illustrates a microphone array 300, in accordance with one embodiment of the present invention.

The microphone array 300 may include an enclosure 310, a plurality of directional or beamformer microphones ("microphones") 320 and an electronic processing circuitry 330. The enclosure 310 may be made of plastic, metal or other suitable material. The microphones 320 may include an array of microphones 320A that may enhance a user's speech quality or the like. The electronic processing circuitry 330 may be contained in the enclosure 310. The electronic processing circuitry 330 may produce a plurality of enhanced acoustic beams 332 that may hear better than any audio input from a hearing aid 334 worn by a user.

The microphone array 300 may either use the electronic processing circuitry 330 contained in the device itself utilizing BLUETOOTH® protocol and other suitable wireless communication protocols, or it could take advantage of any one or more of the functions built into a smartphone (FIG. 1, 124) such as processing capability, electrical power, a battery, a graphics processing unit or GPU, a camera, a BLUETOOTH® communication protocol, and other smartphone functionality.

The microphone array may have a plurality of microphones may be inserted into an enclosure and placed in a more optimal position. Once such example would be directly in front of a hearing impaired individual on the table of a restaurant. The enclosure could take many forms and could accommodate a small or large array of directional microphones. To process the audio input from the microphone, the enclosure could contain more powerful processing circuit than potentially possible with hearing aids as it could be externally powered or more optimally powered by a battery, or a cell phone with a processor or a smartphone battery from an attached smartphone (like a smartphone table-top holder). The device could either use electronics contained in the device itself including BLUETOOTH® protocol and other wireless communication protocols, or it could take advantage of any one or more of the functions built into the smartphone such as processing, power, battery, graphics processing unit or GPU, camera, BLUETOOTH® protocol, and other smartphone functionality.

If a smartphone were utilized on top of the enclosure, and the smartphone was angled-up towards the user, one could utilize the built-in camera (or a camera built into the enclosure) itself to monitor the users head position and gaze. Knowing the gaze and head position could help guide the algorithm and optimize directional microphone selection and processing.

Figure 5:
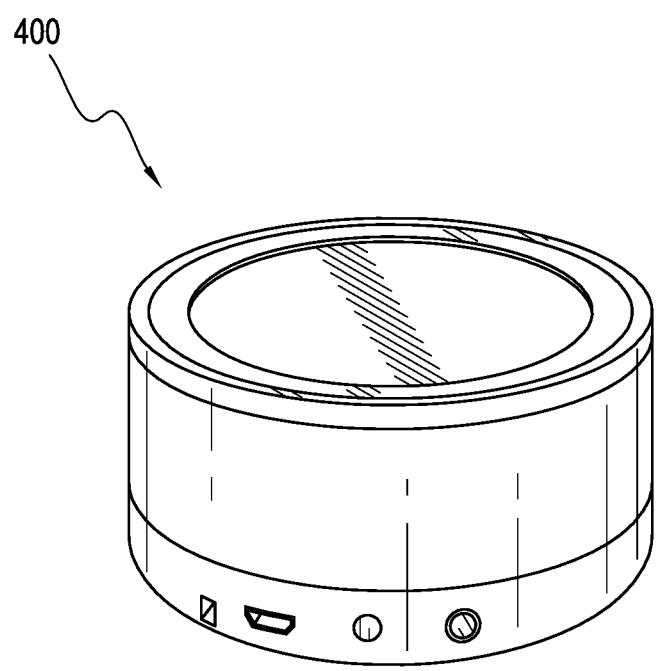
FIG. 5 illustrates a sound puck device, in accordance with one embodiment of the present invention.
Figure 6:
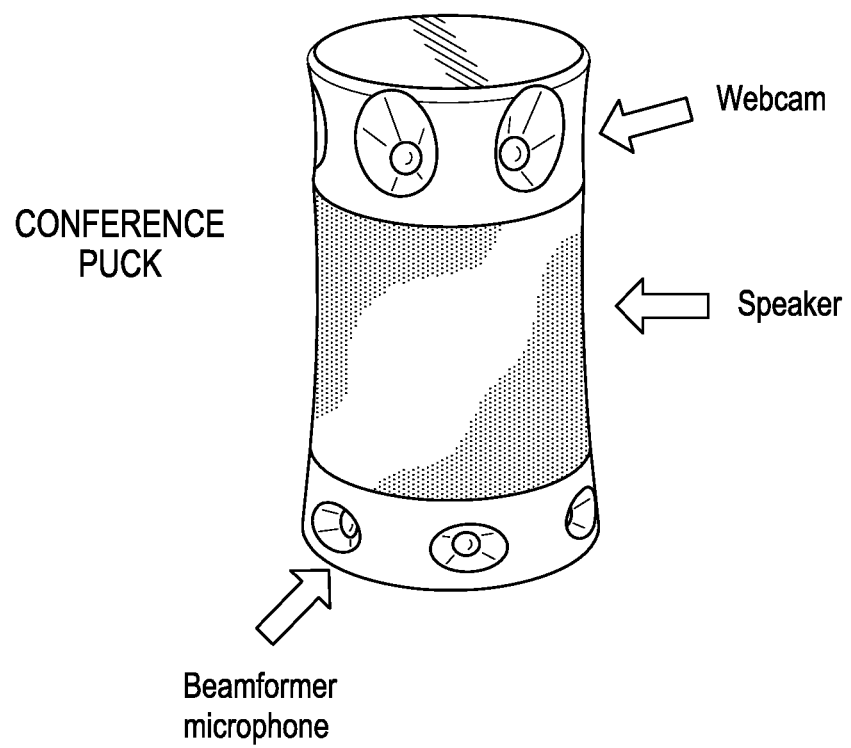
FIG. 6 shows a perspective view of a conference puck device showing beamformer microphones around the periphery of a base, and webcam cameras around the periphery of a top; with a speaker in the middle.

FIG. 5 illustrates a sound puck 400, in accordance with one embodiment of the present invention.

The sound puck 400 may include a casing 410, an input socket 420, an output socket 430 and one or more speakers 440.

The casing 410 may have a top surface 410A and a perimeter siding 410B. The casing 410 may be made of plastic, metal, steel, stainless steel or the like. The input socket 420 may be disposed on the perimeter siding 410B of the casing 410. FIG. 4 illustrates an input socket 420 that is an AUX IN input socket 420A, a first indicator light 422 that is an AUX OUT indicator light 422A and a second indicator light 424 that may be a transparent battery indicia 426. The transparent battery indicia 426 may serve as functional indicia to notify when a battery 428 of the sound puck 400 is being charged by blinking as the battery 428 is being charged. The transparent battery indicia 426 may serve as functional indicia to notify when the battery 428 of the sound puck 400 is fully-charged by remaining illuminated as long as the battery 428 is holding a charge. The output socket 430 may be a direct current and state vector or DC/SV output socket 432 or the like. The one or more speakers 440 may be disposed on top surface 410A of the casing 410. The one or more speakers 440 may be one or more parametric speakers 440A or the like.

The system may include an IHOLDER® device and/or a sound puck. The system may also be used to augment hearing in normal listening environments. This may be implemented via wireless connection (BLUETOOTH® protocol and others) to an assistive hearing device such as a hearing aid, assistive hearing device, BLUETOOTH® protocol headset, earbuds, headphones, or cochlear implants. The system (including directional augmented gaze tracking) could also be equipped with parametric speakers to direct the sound directly to the user's left and right ears without the use of any ear-mounted device like a hearing aid.

A smartphone holder (of which one version is for IPHONE6® device—i.e., an IHOLDER® device) that holds the smartphone on the desk at an angle that is ideal for viewing while sitting at a desk. The bottom of the holder has rubber pads to prevent sliding. The IHOLDER® device could provide power and convenient viewing of the IPHONE® device. The IHOLDER® device contains one or more cameras that is idealized in focus and magnification to allow for viewing of the users face and may also utilize more than one camera to determine head position and gaze. Said IHOLDER® camera is constantly monitoring user and contains a circuit (or via software on the smartphone) to perform as a first step recognition of gaze. Upon gaze recognition, either through software and/or hardware, the IPHONE® device feeds back information that selects an ideal microphone combination from the microphone array and may also perform noise cancellation. This functionality may also be implemented on Android, Windows and other smart phones, or a dedicated device that performs similarly, but is not a smartphone.

Figure 7:
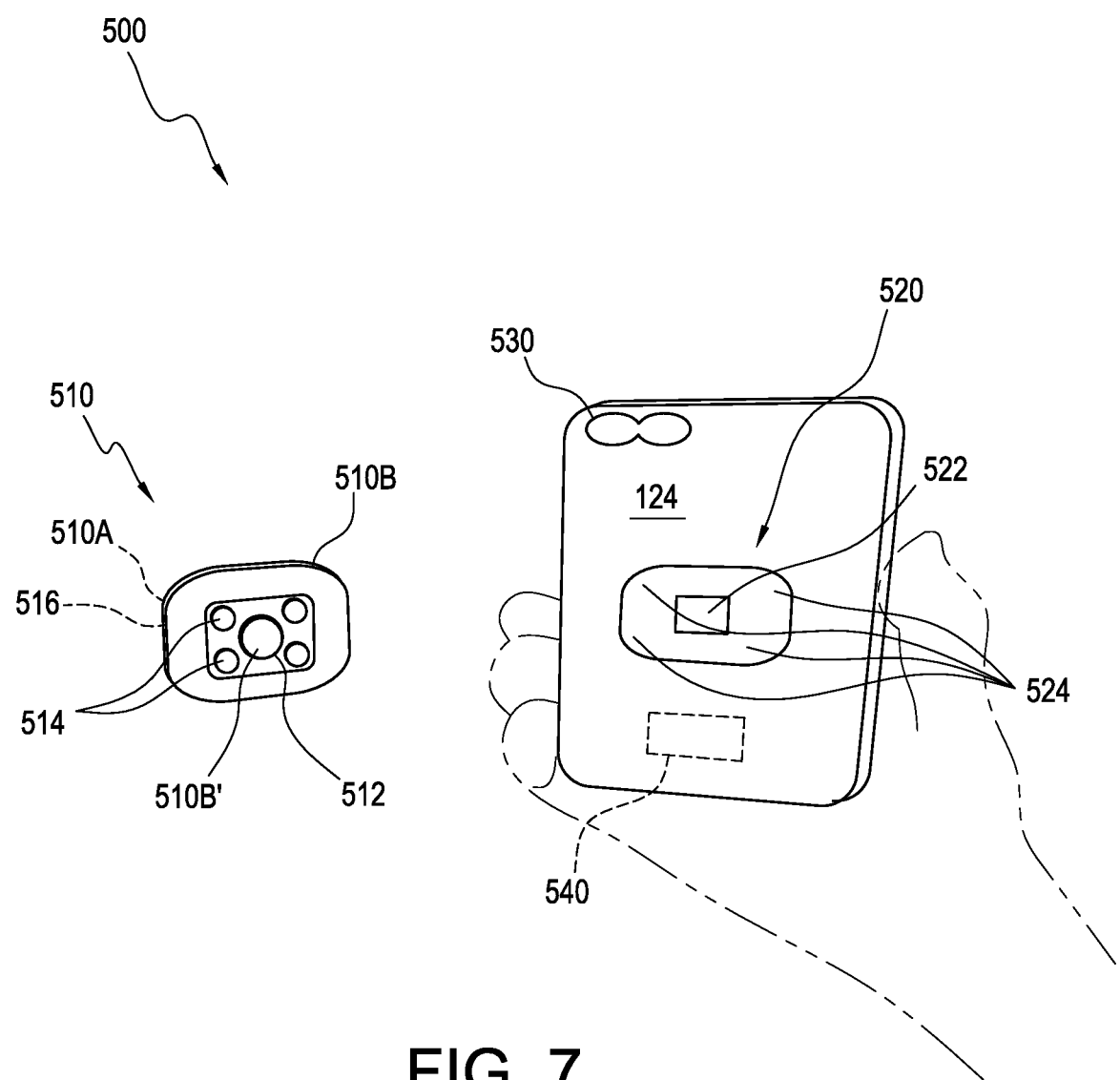
FIG. 7 illustrates a smartphone holder, in accordance with one embodiment of the present invention.

FIG. 7 illustrates a smartphone holder 500, in accordance with one embodiment of the present invention. More specifically, FIG. 7 illustrates a smartphone holder 500 disposed on a surface.

The smartphone holder 500 may include a base 510 and a smartphone attachment piece 520.

The base 510 may include a bottom surface 510A and a top surface 510B with a middle portion 510B'. The base 510 may include a raised centered coupling 512 disposed on the top surface 510B with the middle portion 510B' of the top surface 510B of the base 510. The top surface 510B of the base 510 may include four equidistance indentations 514 disposed around the raised centered coupling 512. The base 510 may also include one or more rubber pads 516 that may be disposed on the bottom surface 510A of the base 510 to prevent the smartphone holder 500 from moving while placed on a surface or an object or the like. The smartphone attachment piece 520 may include a centered attachment aperture 522 with four equidistant attachment tabs 524 surrounding the centered attachment aperture 522. The smartphone attachment piece 520 may be coupled to the base 510 by inserting the centered attachment aperture 522 with four equidistant attachment tabs 524 into the aligned raised centered coupling 512 and four equidistance indentations 514 and twisting the smartphone 124 coupled to the smartphone attachment piece 520, thereby securing the coupled smartphone 124 in place. The smartphone 124 may include one or more cameras 530 and a sound recording app 540 that may acquire video and sounds of a user within the video and audio capability of the smartphone 124.

Figure 11A:
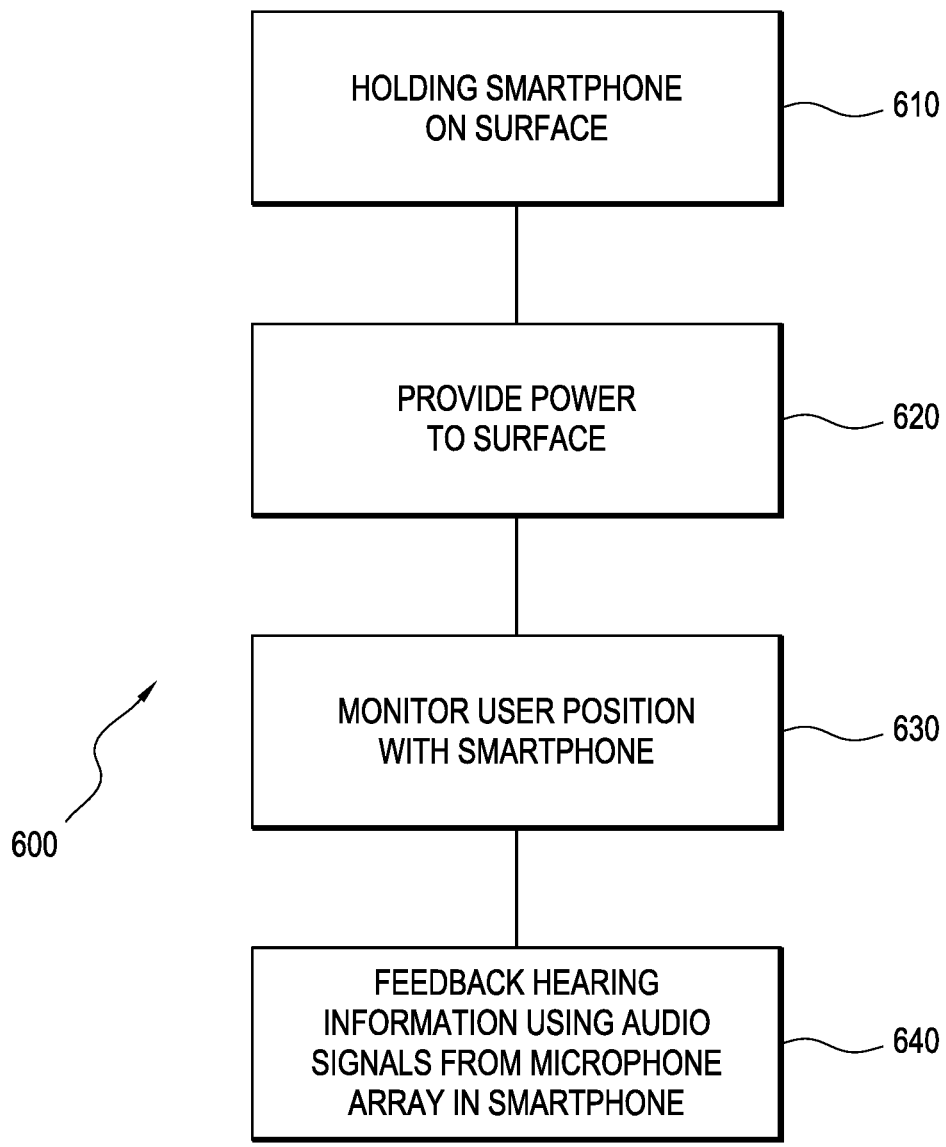
FIG. 11A is a flowchart of the steps for a method, according to the invention.

FIG. 11A illustrates a flowchart of a method for improving hearing, in accordance with one embodiment of the present invention.

The method 600 may include the steps of holding a smartphone on a surface that allows viewing a user with the smartphone 610, having a client system provide electrical power while securing the smartphone to the surface 620, constantly monitoring the user with the smartphone that is idealized in focus and magnification to allow for viewing of the user 630 and feeding back hearing information from the client system that selects ideal microphone combination from a microphone array from the smartphone 640.

The surface of the holding step 610 may include the surface an object or the like. The client system of the having step 620 may include a microphone array, a sound puck or a smartphone holder. The constantly monitoring step 630 may use more than one camera utilized to determine head position and gaze of the user. The feeding back hearing information step 640 may use hearing information is from a device selected from the group consisting of one or more external speakers, one or more external parametric speakers, the smartphone with or without one or more ear bud, a hearing aid, an assistive hearing device, a BLUETOOTH® protocol headset, a cochlear implants, a set of headphones, or any device used to hear or enhance hearing. The feeding back hearing information step 640 may also include one or more steps of performing gaze tracking, noise cancellation, analysis of gaze tracking, selection of microphone combination and sound amplification. A non-transitory computer storage media having instructions stored thereon which, when executed, may execute the steps of the overall method 600.

Figure 11B:
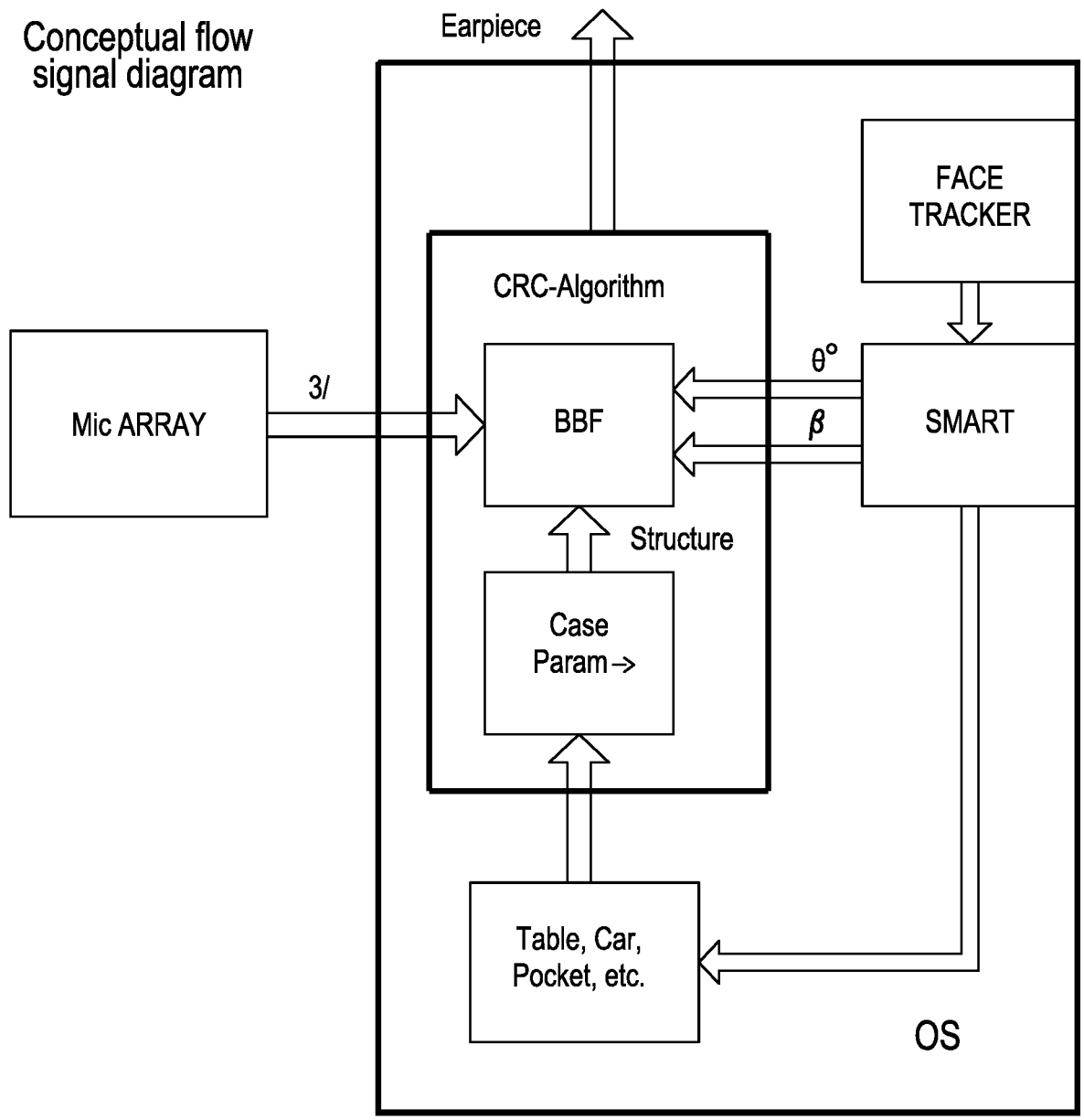
FIG. 11B illustrates a signal diagram.

FIG. 11B shows a flow signal diagram of how the acoustic signals are inputted, processed and outputted to an earpiece. The microphone array, of in this case three microphones are fed to a BBF (beamformer). The BBF also receives face tracker signals indicating the position and orientation of a user through SMART, which outputs data signals $\theta°$ and $\beta$. The SMART also outputs to a Table, Car, Pocket block which outputs to a case parameter block. The CRC-Algorithm performs the acoustic processing.

One environment where the system and method for improving hearing would be used could be in noisy environments (i.e., restaurants and the like) where hearing may be improved by the system and method.

A sensor and/or microphone array may be embedded in glasses. Small microphones can be mounted to the front of the users eye glasses to augment ability to hear in noise using beamforming and/or directional microphones in the glasses. A directional chip and/or microphones may be embedded in eye glasses. The array of microphones are thus contained in a device worn by the user. The headset may include at least one of a plurality of microphones and a sensor to detect head movement and position. In another embodiment head position and tracking may be achieved via gyroscope/accelerometer equipped ear buds, headphones, bone/cartilage conduction devices, hearing aids, cochlear implants, or any other listening device detected, and used to optimize microphone selection, optimal audio settings, and noise cancellation. In another embodiment the audio output signals can be outputted through a speakerphone. The system may include a location detection sensor such as a GPS device which detects location and controls optimal audio characteristics for that location. Very small bone conduction speakers ("bone conduction device") can mount behind the ear against the mastoid process (or any bone location around the ear), or against the cartilage behind the ear. They could be standalone, adhering to skin or back of ear, and or be mounted to and/or slid over the back temple of glasses behind the ear is paired with the other sound puck device. These may contain foam for comfort and could be universal to interface with a variety of glasses styles. These devices could contain one or more sensors for determining head position to augment microphone selection and sound optimization. Sensors could include any combination of a gyroscope and/or accelerometer. These devices could also be used for Fitbit-like measurement of activity, sleep tracking, etc. and/or could contain other sen-sors to measure temperature, skin moisture, and/or ECG.

The following patents and published patent applications are incorporated by reference herein, and provide disclosure on the types of signal enhancement that can be performed by a signal processing algorithm on either the local device, or by a remote server.

U.S. Pat. No. 8,953,817 discloses a system and method for producing a directional output signal. The two microphones could be used in the present invention, and the algorithm to process and enhance the sound can be used in the system of the present invention.

U.S. Pat. No. 8,947,978 discloses a system and method for estimating the direction of arrival of a sound. The microphones could be used in the present invention, and the algorithm to process and enhance the sound can be used in the system of the present invention, or detect the location of origin of the sound.

U.S. Pat. No. 8,755,547 discloses a method and system for enhancing the intelligibility of sounds. This system can be used in the system of the invention to enhance the sound quality of the sound signals.

U.S. Pub. Appln. No. 2013/0223644 describes a system and method for reducing unwanted sounds in signals received from an arrangement of microphones. This system can be used in the system of the invention to enhance the sound quality of the sound signals.

U.S. Pub. Appln. No. 2016/0005417 discloses a noise reduction system and method. This system can be used in the system of the invention to reduce the noise and thus enhance the sound quality of the sound signals.

U.S. Pub. Appln. No. 2008/0063228 discloses an acoustically transparent occlusion reduction system and method. This system may be used in the system of the present invention to improve sound quality, or at least the user's perception of sound quality.

The above patents and published patent application disclose both acoustic components such as microphones, and algorithms, to enhance sound quality. The algorithms may be used as algorithms in the system of the present invention, as will be understood by those skilled in the art.

Figure 12A:
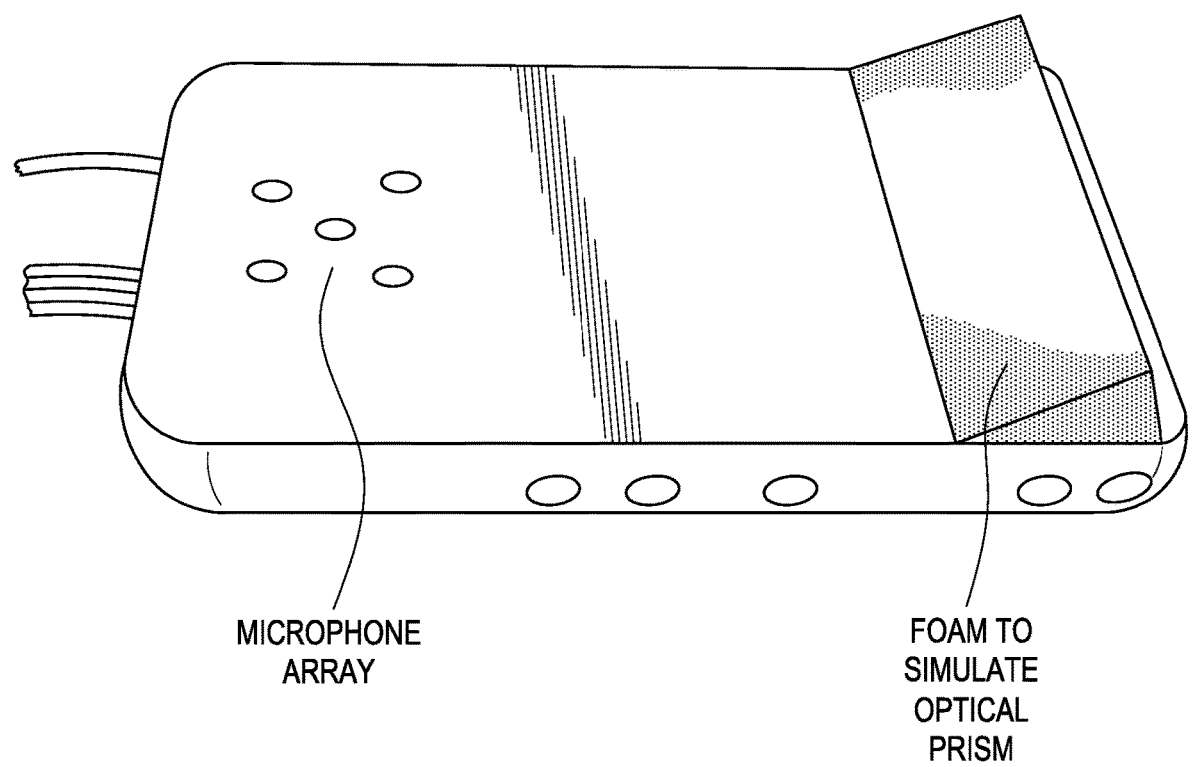
FIG. 12A shows an embodiment of an enclosure with microphones mounted on an exterior surface.

FIG. 12A shows an embodiment of an enclosure with microphones mounted on an exterior surface. This embodiment consists of an enclosure in the form of a rigged iPhone 6+ case with a molded rubber prism-shaped piece on one end of the case, and six (6) microphones (see numbers 1-6) on the other end of the case. Measurements were taken without the molded rubber 'prism', to determine its effects on performance. An additional microphone location (see number 6) placed closer to the edge of the device.

Figure 12B:
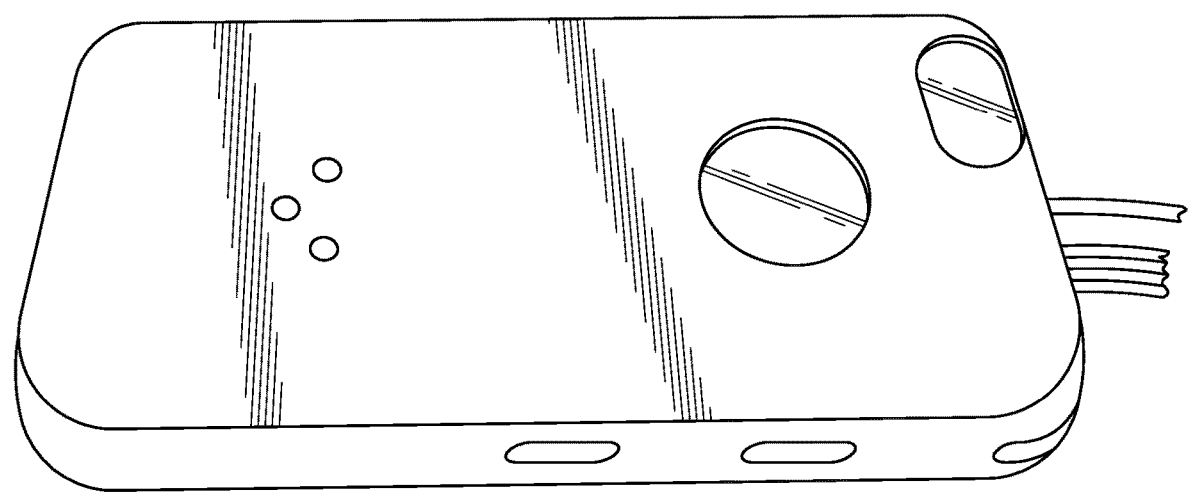
FIG. 12B shows an embodiment using an iPhone 6+ case.

FIG. 12B shows an embodiment constructed using a rugged iPhone 6+ case and optimally placed surface-mount microphones.

Figure 9:
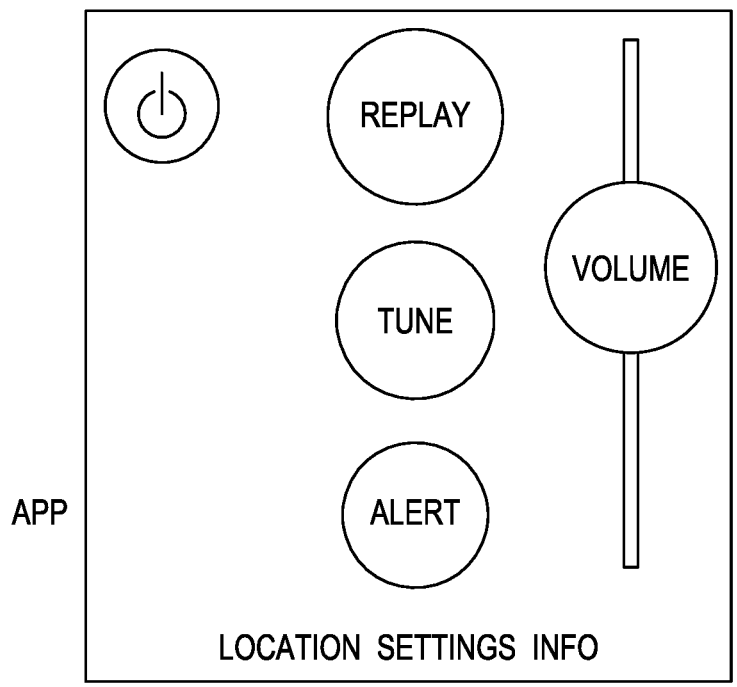
FIG. 9 shows control buttons or icons which could be used in a smart puck.
Figure 8:
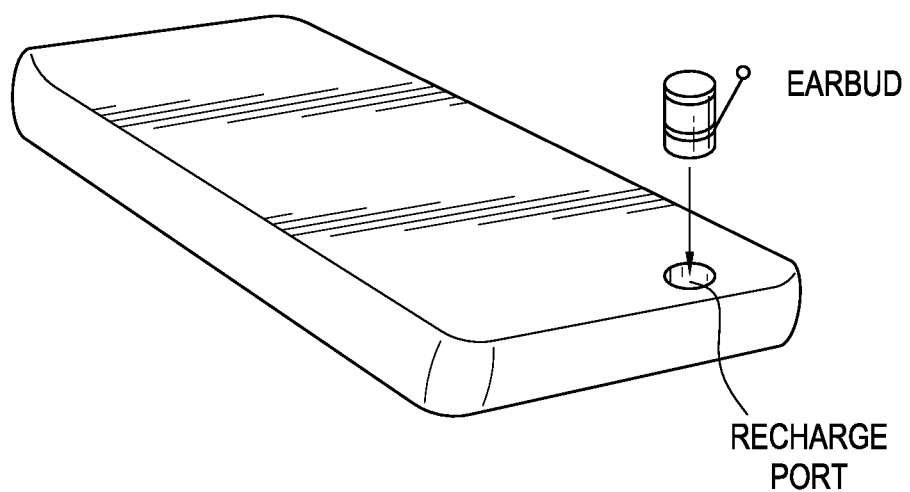
FIG. 8 shows an embodiment of a smartphone having a receptacle used as a charging part for an earbud.
Figure 10:
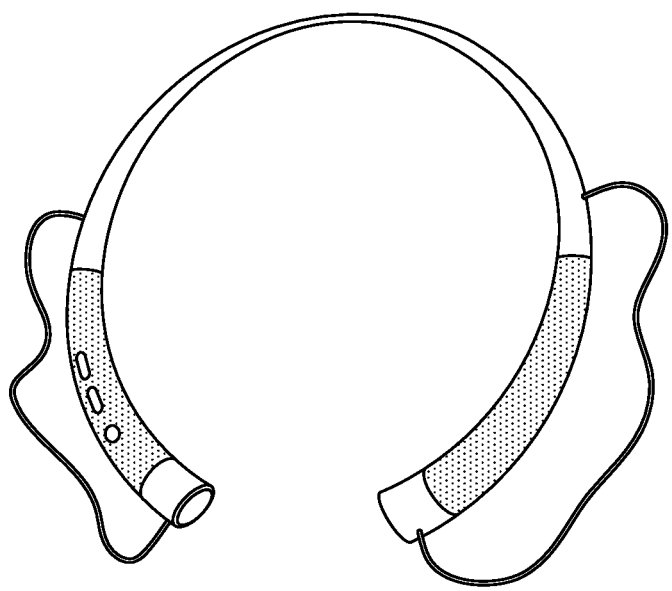
FIG. 10 shows a perspective view of a neckband earbud.
Figure 13:
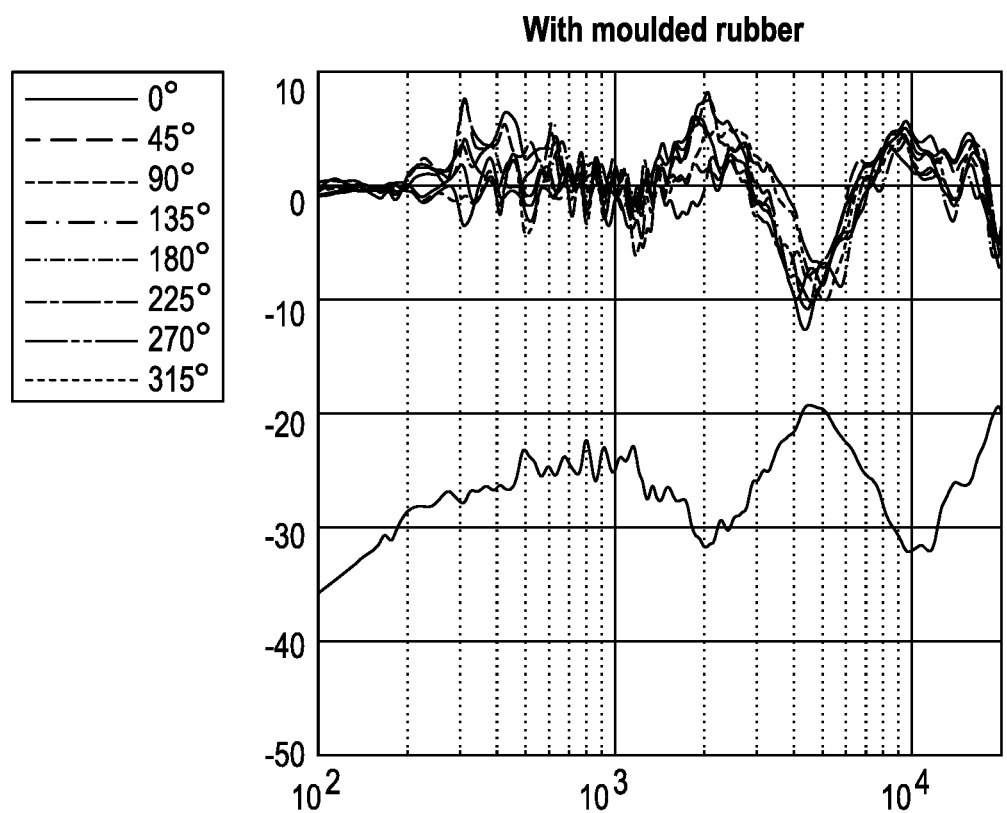
FIG. 13 is a graph of measurements obtained from the device of FIG. 8 with the microphones located towards the rear of the device (180° azimuth)
Figure 14:
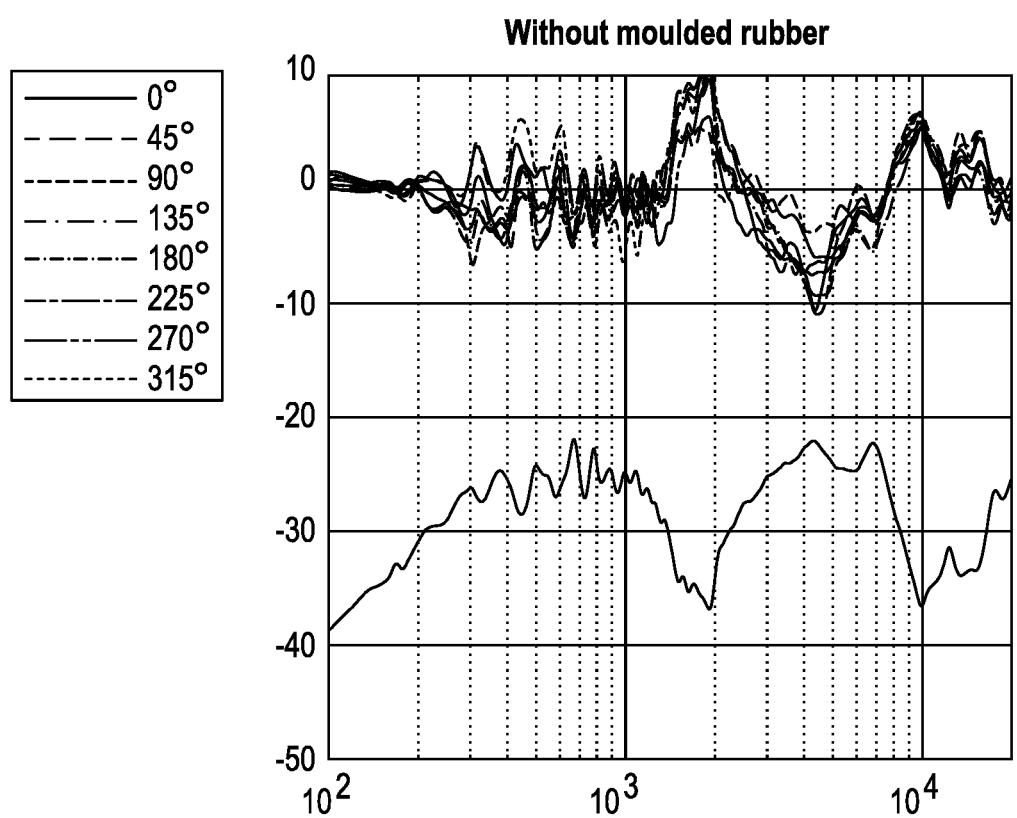
FIG. 14 is a graph of measurements from the device like that of FIG. 9, but with the moulded cover removed.

FIGS. 13 and 14 show measurements obtained from microphone #1 of FIG. 8 with the microphones located towards the rear of the device (180° azimuth). FIG. 9 has the molded rubber in place, while FIG. 10 has the molded rubber removed. The magenta trace shows the measurement of a 0° source; all other traces have been referenced to this 0° trace. The 0° trace presents poor performance for both scenarios, indicating that diffraction from the case itself is a significant contributor to comb filtering effects. These results show that microphone locations towards the front of the case are preferable for the intended application, delegating the poor microphone response to sources at the rear of the device.

Figure 15:
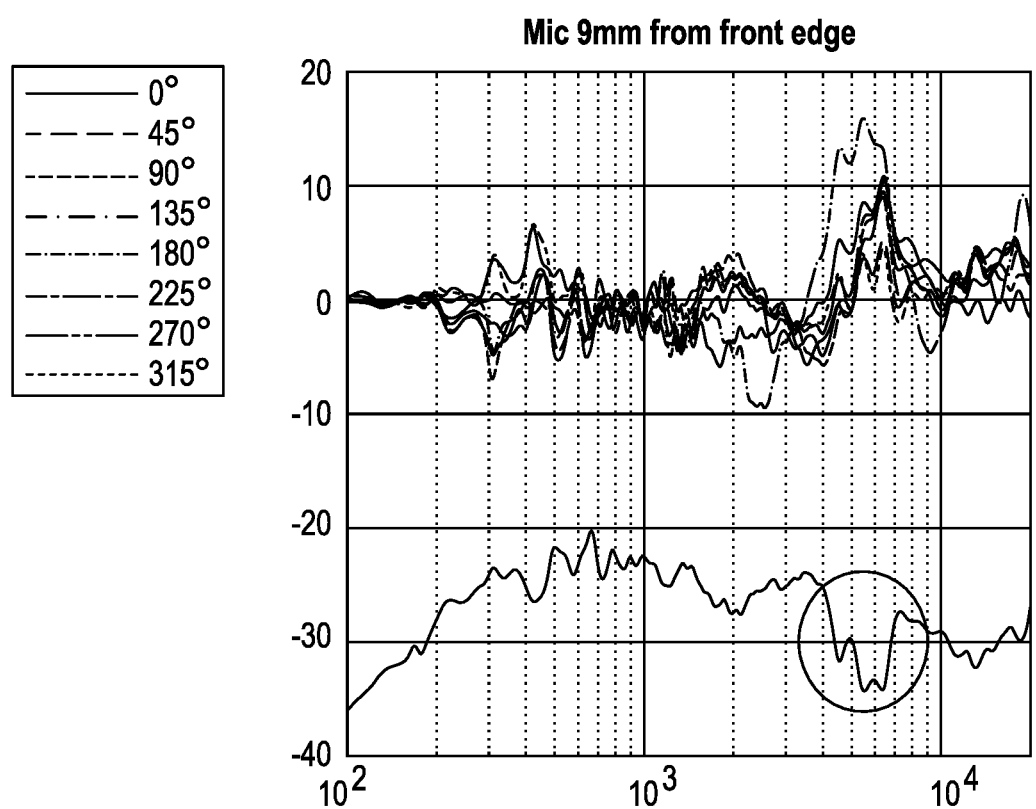
FIGS. 15-18 are graphs of measurements obtained with microphones positioned towards the front of the case (0° azimuth)
Figure 16:
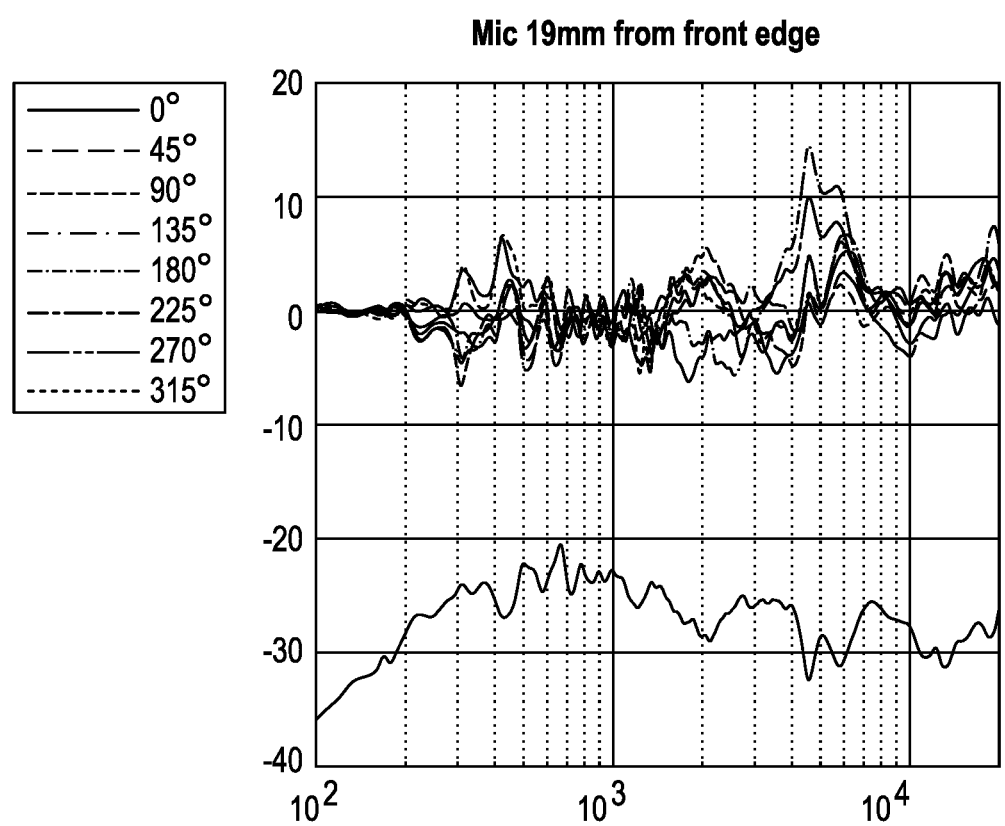
Figure 17:
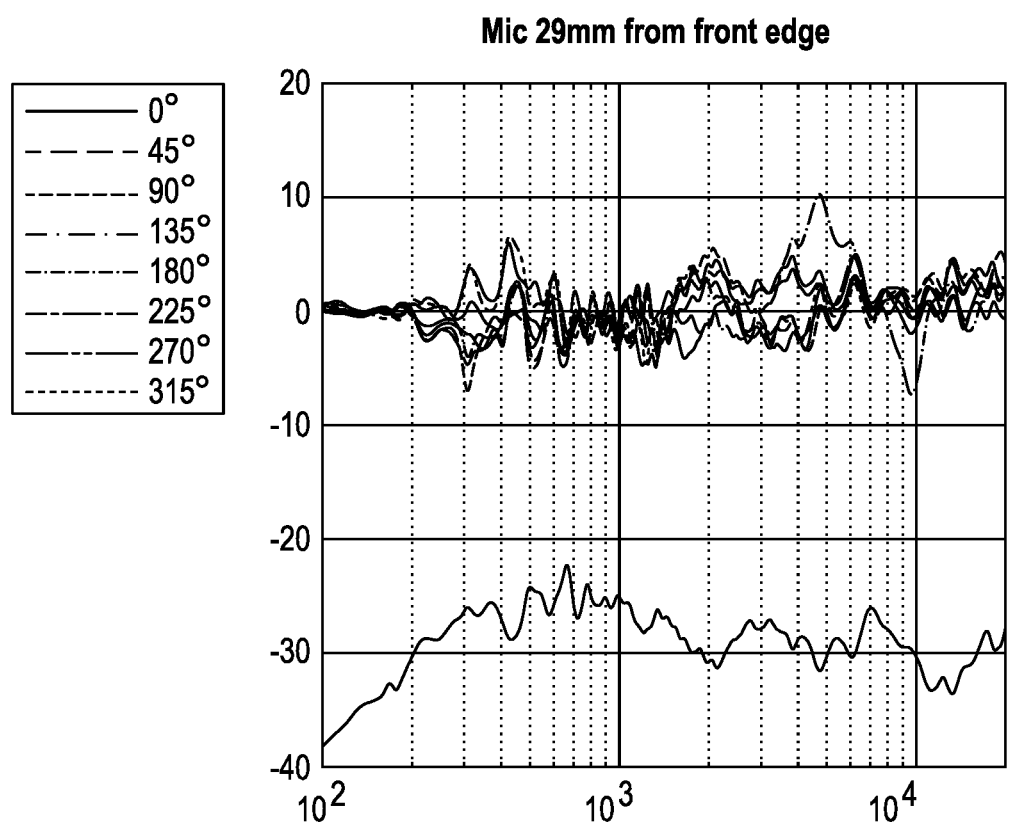
Figure 18:
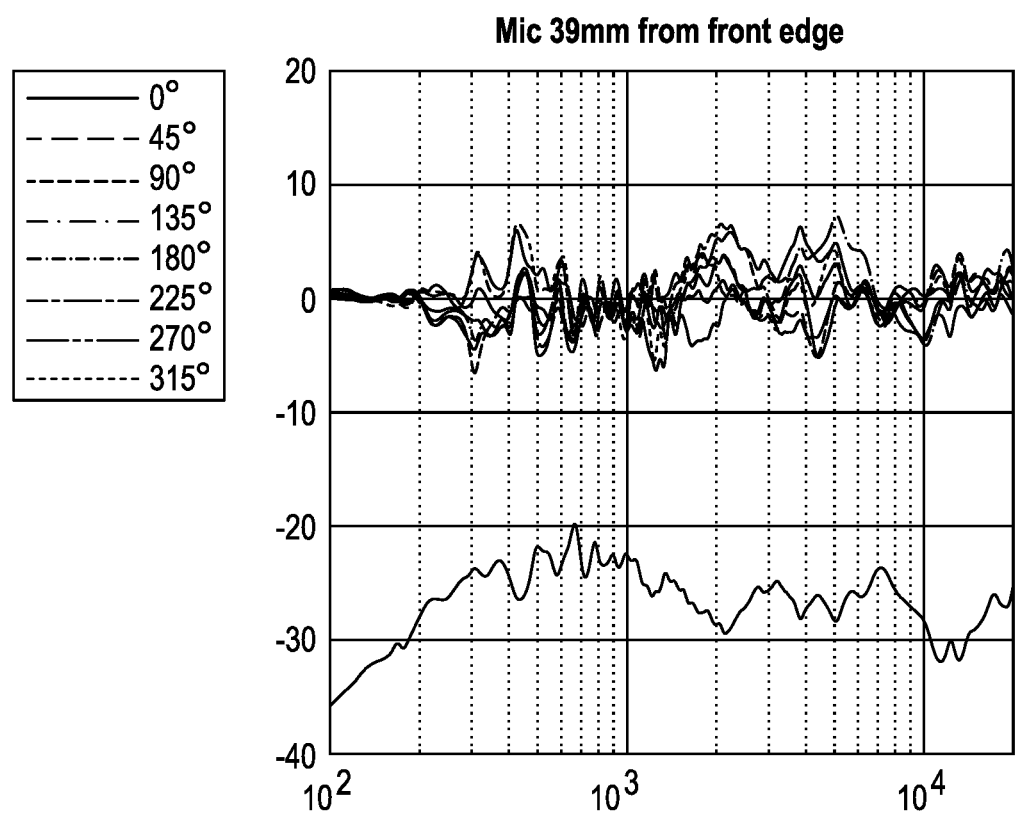
Figure 19:
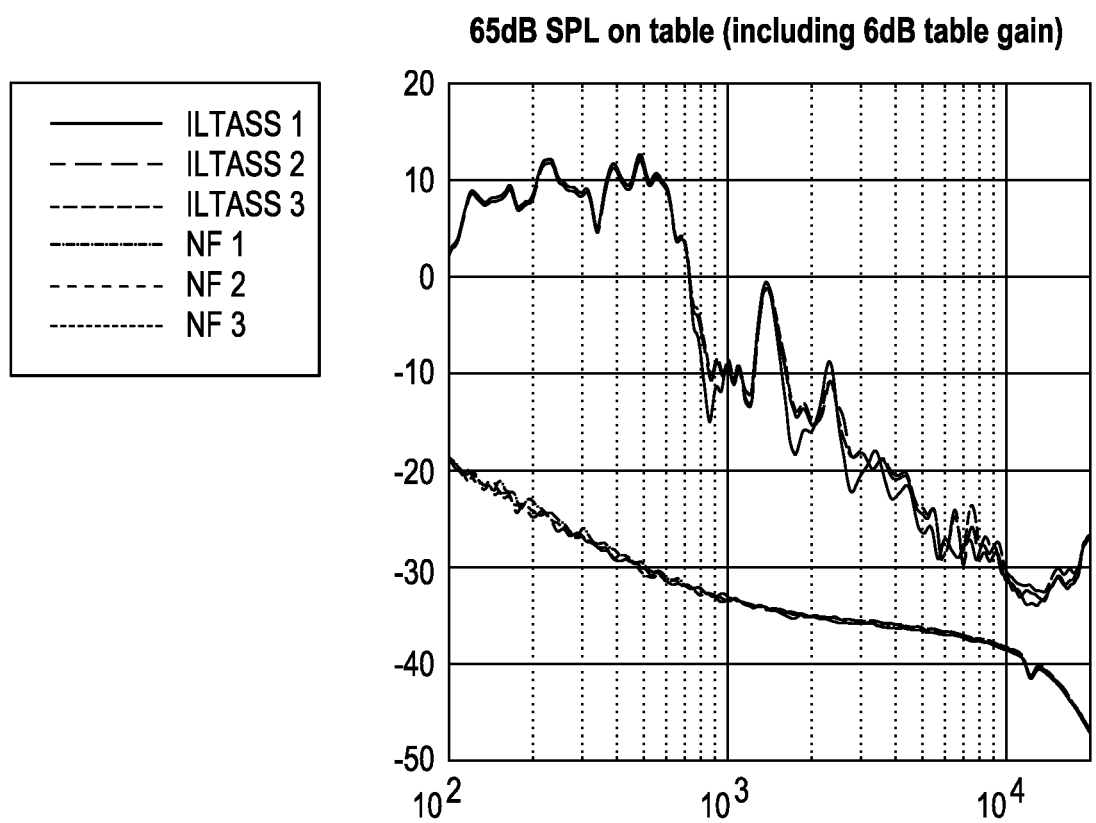
FIG. 19 is a graph of measurements obtained from a single surface microphone placed on a table.
Figure 20:
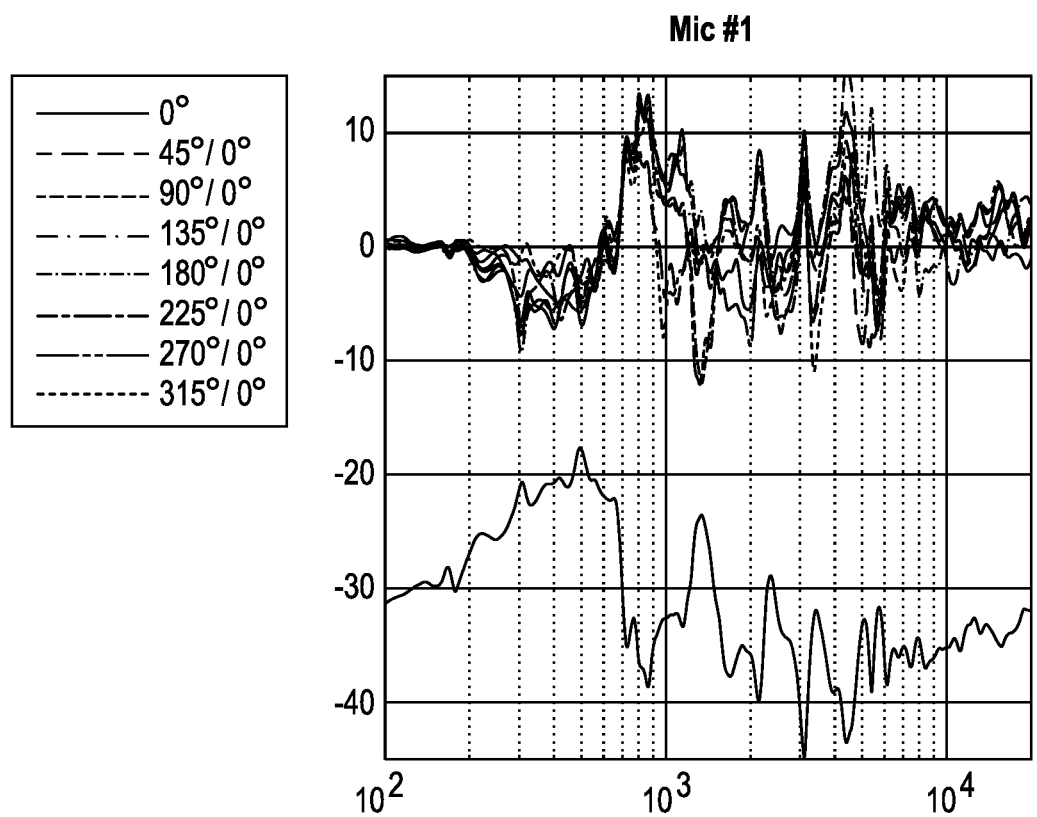
FIG. 20 is a graph of measurements obtained from a microphone directly surface mounted to a case.
Figure 21:
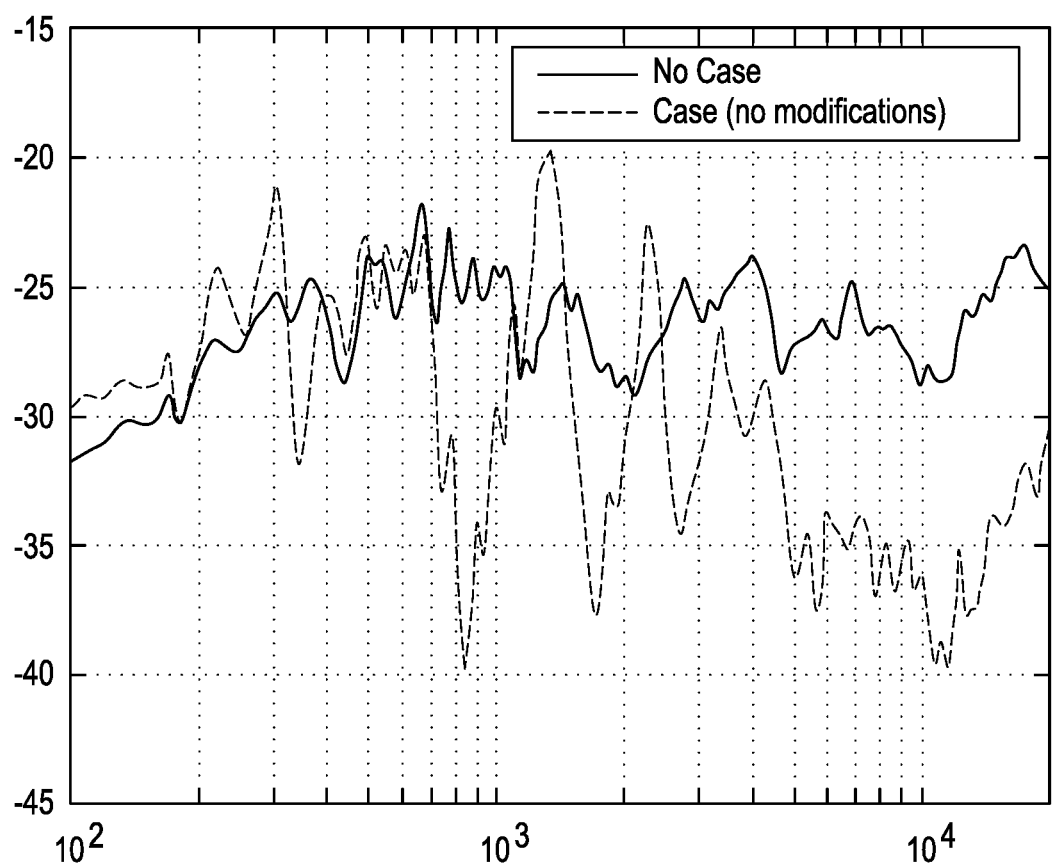
FIGS. 21-26 show graphs of measurements showing comparisons between a "no-case" reference measurement taken with the surface-mount microphone placed directly on the table-top, and each in-case measurement.
Figure 22:
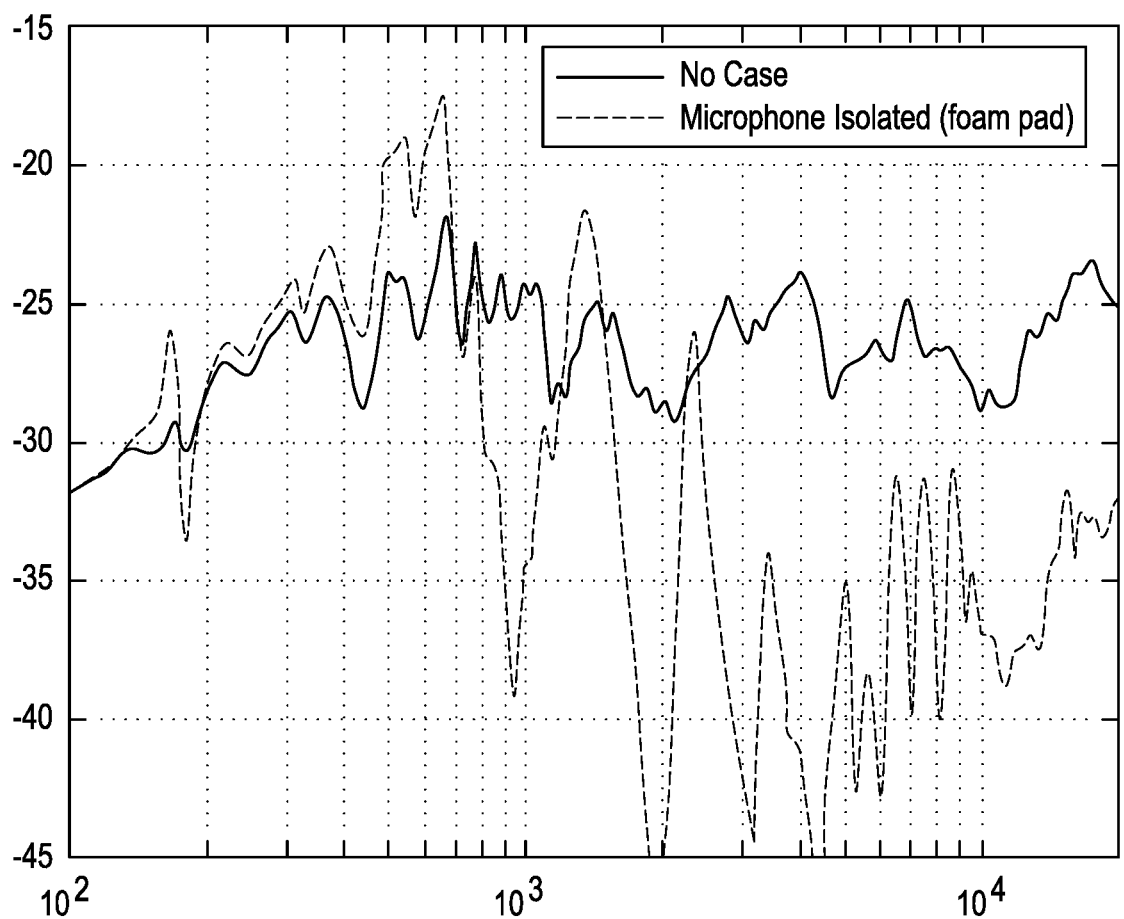
Figure 23:
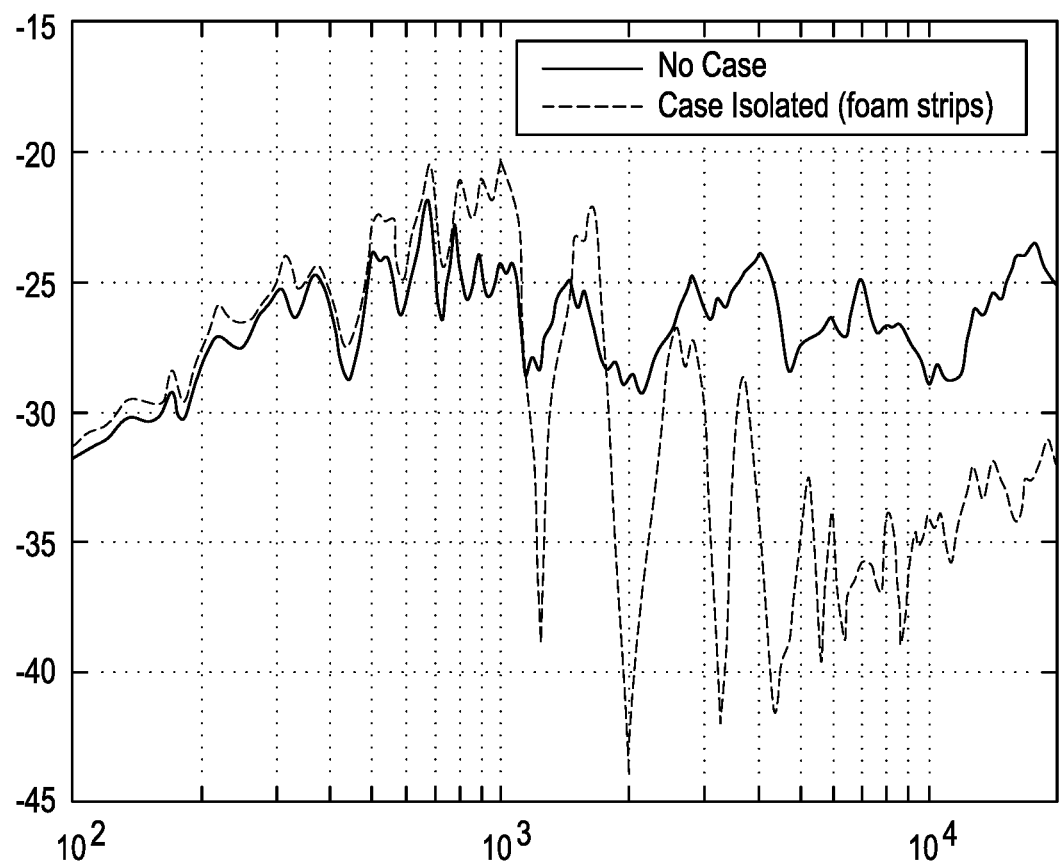
Figure 24:
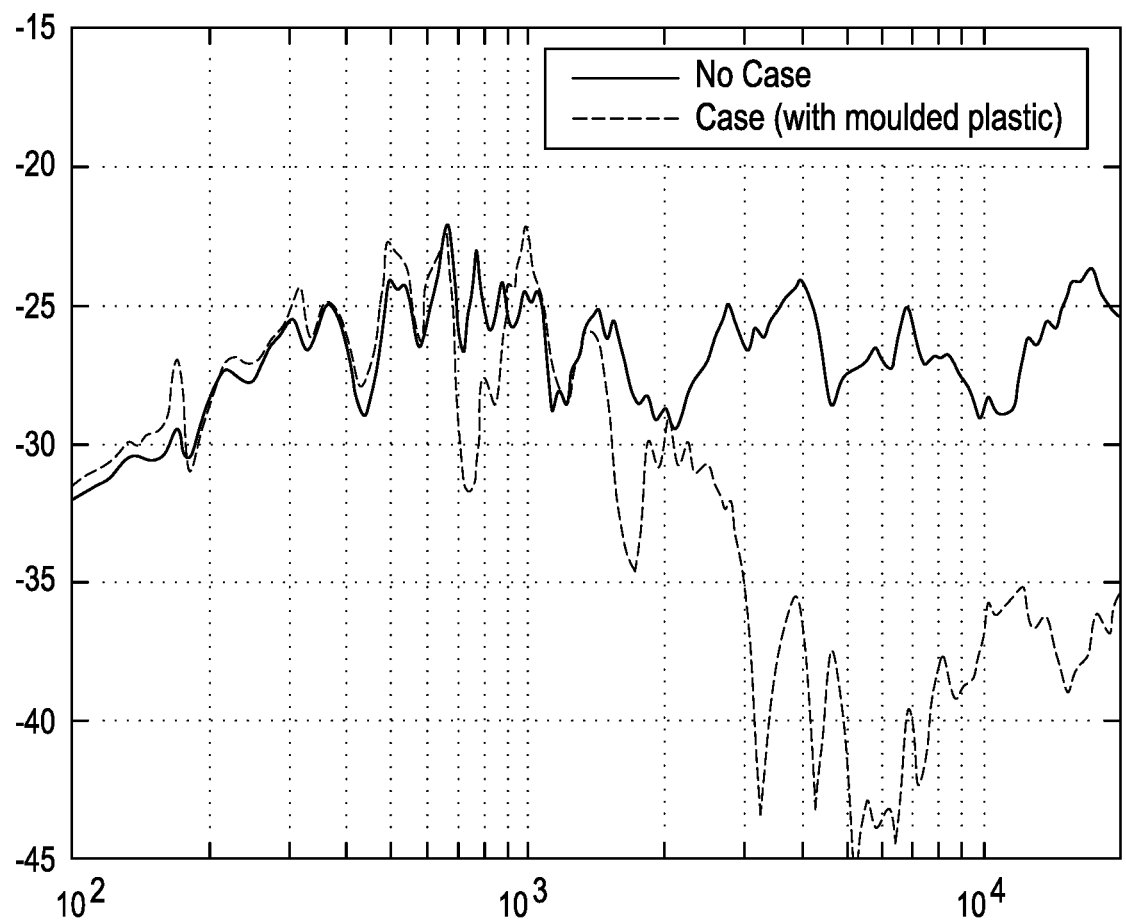
Figure 25:
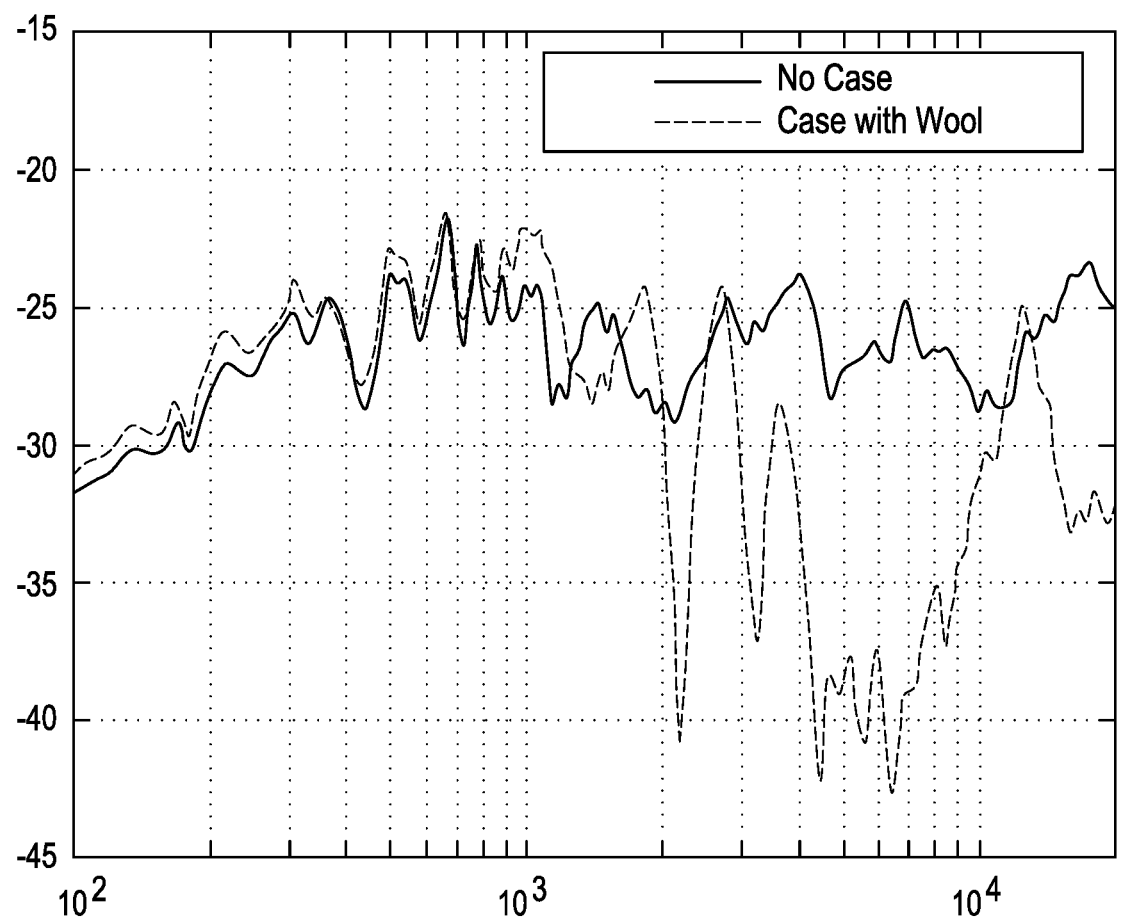
Figure 26:
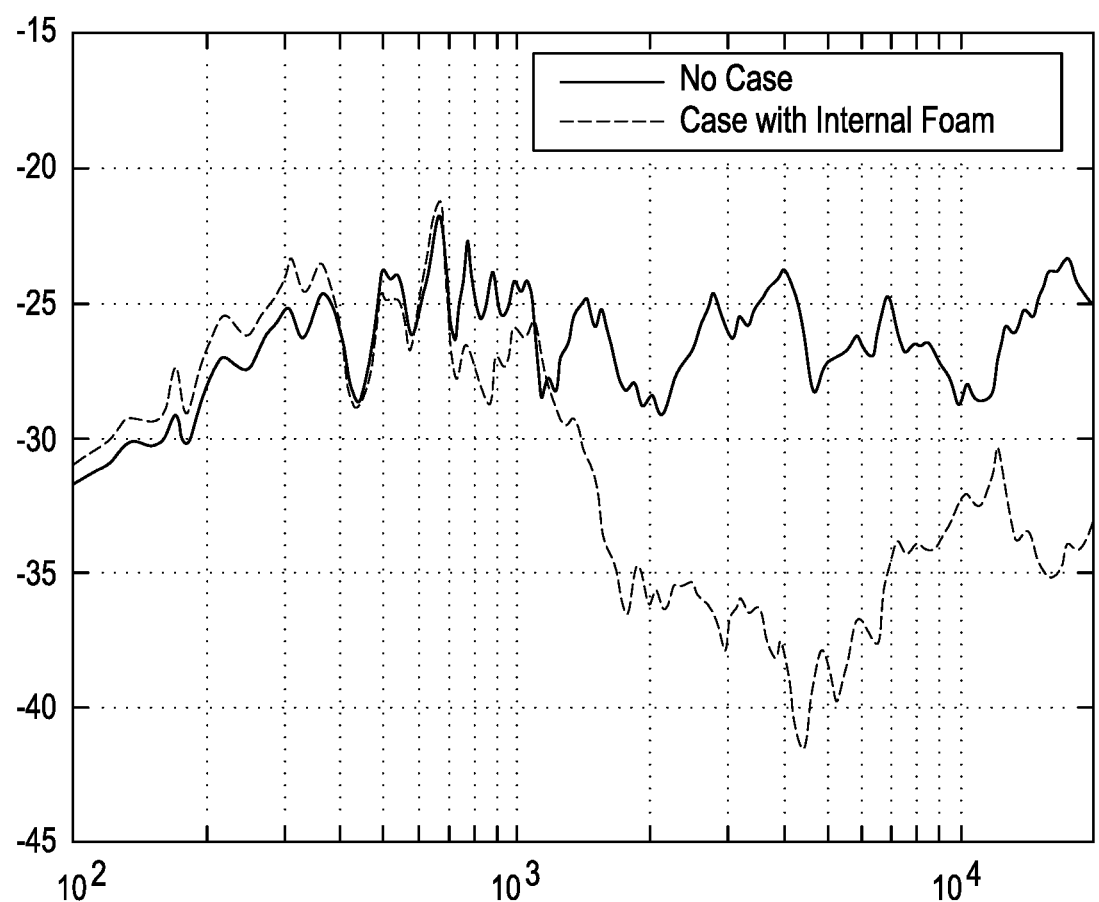

FIGS. 15-18 shows detail measurements undertaken with microphones positioned towards the front of the case (0° azimuth). These measurements explore the effects that the distance between microphone and front case edge have on measured performance. The blue circle in FIG. 15 shows a notch at 5-6 kHz that occurs in the 0° azimuth measurement of microphone #6. This notch fills in as the microphone location moves further back. From these results, the optimum microphone location appears to between 20 mm and 50 mm from the front case edge. Measurements of a single surface-mount microphone placed on a table confirmed that the microphone response was linear and omnidirectional. The noise floor of the microphones was compared with measurements of ILTASS (long-term speech spectrum) noise of 65dBSPL at the table-top, shown in FIG. 11. These results indicate the surface-mount microphones have acceptable self-noise characteristics for the intended application. Measurements of the microphones mounted to the case suggested structure-borne and/or airborne noise contamination of the microphone signals. The polar measurement of a case-mounted microphone presented in FIG. 20 below indicates heavy comb-filtering from the addition of delayed signals due to structure-borne and/or airborne noise. Various modifications to the prototype were assessed in order to better understand the source of contamination, including:

Decoupling the microphones from the case with foam;
Decoupling the device from the table;
Filling the case with mouldable plastic;
Inserting a layer of absorptive wool inside the cavity;
Inserting a layer of absorptive foam inside the cavity.

FIGS. 21-26 present comparisons between a 'no case' reference measurement taken with the surface-mount microphone placed directly on the table-top, and each in-case measurement. The modification with the greatest impact was the case with internal foam, shown in FIG. 26. This modification improves the performance in several ways; firstly it presses firmly against the front and back case panels providing damping effects of panel resonances, and secondly it provides absorption of any airborne radiation within the cavity. The resulting response is free of the comb filtering seen in all other figures.

The product will preferably not have any internal cavities of a comparable size to the tested prototype, and panel resonances are likely to be damped by the presence of a flush-mounted phone within the case. However, the surface-mount microphones are very sensitive to both airborne and structure-borne noise contamination. Microphones will preferably include vibration isolation from the case and adjacent internal cavities treated with absorptive foam.

The results confirm that the preferred embodiment of FIGS. 1A-1E yields the best acoustic performance in terms of microphone placement.

A microprojector can be incorporated into the design. A projector can reside behind the ear and connect with a light pipe that goes along the temple of glasses and then projects the desired image and/or text to the surface of the user's eye glasses and then through the pupil and into the eye. This could be accomplished with or without a beam splitter coating on the eye glasses. This would allow viewing of images and text through the glasses and also of the desired scene. The mechanism would be hidden from view in one embodiment. A beamsplitter could be accomplished with specific glass lens, coating, and/or plastic overlay for glasses.

Figure 27:
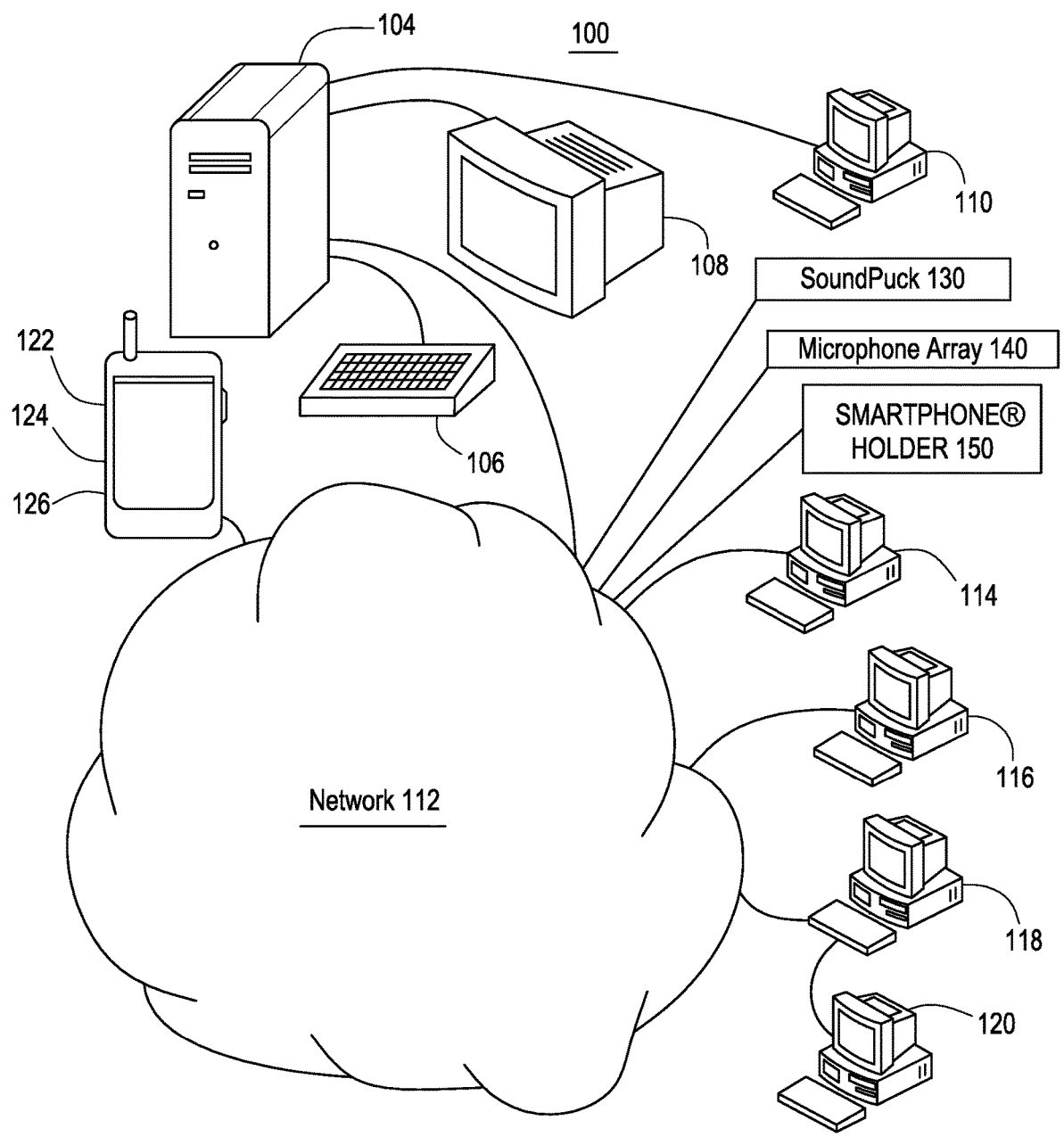
FIG. 27 illustrates a network based system overview of a system for improving hearing, in accordance with one embodiment of the present invention.

FIG. 27 illustrates a system overview of a system 100 for improving hearing.

The system 100 may include a server system 104, an input system 106, an output system 108, a plurality of client systems 110, 114, 116, 118 and 120, a communications network 112 and a handheld wireless device 122. In other embodiments, the system 100 may include additional components and/or may not include all of the components listed above.

The server system 104 may include one or more servers. One server system 104 may be the property of the distributor of any related software or non-transitory storage media.

The input system 106 may be utilized for entering input into the server system 104, and may include any one of, some of, any combination of, or all of a keyboard system, a mouse system, a track ball system, a track pad system, a plurality of buttons on a handheld system, a mobile system, a scanner system, a wireless receiver, a microphone system, a connection to a sound system, and/or a connection and/or an interface system to a computer system, an intranet, and/or the Internet (i.e., Infrared data association (IrDA), universal serial bus or (USB)).

The output system 108 may be utilized for receiving output from the server system 104, and may include any one of, some of, any combination of or all of a monitor system, a wireless transmitter, a handheld display system, a mobile display system, a printer system, a speaker system, a connection or an interface system to a sound system, an interface system to one or more peripheral devices and/or a connection and/or an interface system to a computer system, an intranet, and/or the Internet.

The system 100 illustrates some of the variations of the manners of connecting to the server system 104, which may be an information providing website (not shown). The server system 104 may be directly connected and/or wirelessly connected to the plurality of client systems 110, 114, 116, 118 and 120 and may be connected via the communications network 112. Client systems 120 may be connected to the server system 104 via the client system 118. The communications network 112 may be any one of, or any combination of, one or more local area networks (LANs), wide area networks (WANs), wireless networks, telephone networks, the Internet and/or other networks. The communications network 112 may include one or more wireless portals. The client systems 110, 114, 116, 118 and 120 may be any system that an end user may utilize to access the server system 104. For example, the client systems 110, 114, 116, 118 and 120 may be personal computers, workstations, laptop computers, game consoles, handheld network enabled audio/video players, mobile devices and/or any other network appliance.

The client system 120 may access the server system 104 via the combination of the communications network 112 and another system, which in this example may be the client system 118. The client system 120 may be a handheld wireless device 122, such as a mobile phone, tablet or a handheld network-enabled audio or music player, which may also be utilized for accessing network content. The client system 120 may be a cell phone with an operating system or smartphone 124 or a tablet with an operating system or IPAD® device 126.

Figure 28:
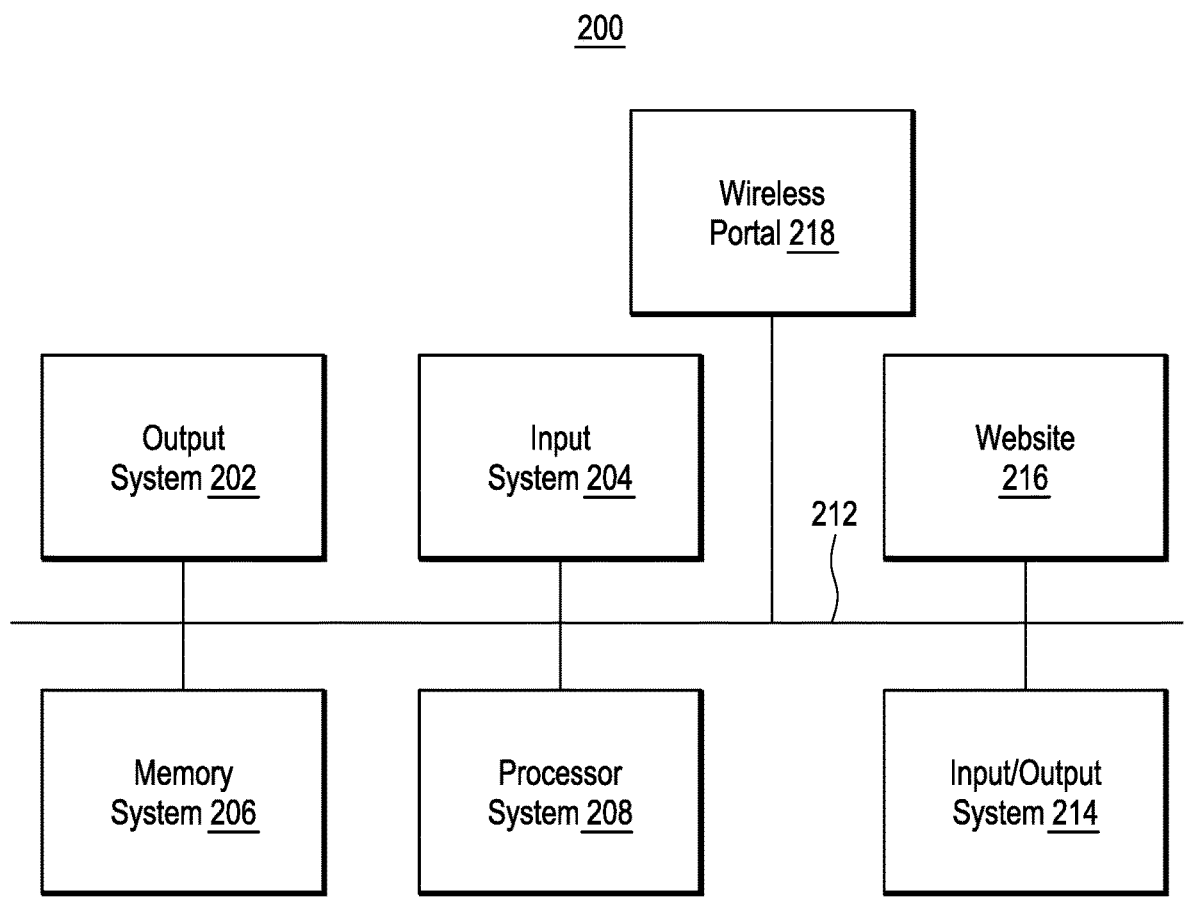
FIG. 28 illustrates a block diagram of a client system, in accordance with one embodiment of the present invention.

FIG. 28 illustrates a block diagram of a client system 200.

The client system 200 may include an output system 202, an input system 204, a memory system 206, a processor system 208, a communications system 212, an input/output system 214, a website 216 and a wireless portal 218. Other embodiments of the client system 200 may not have all of the components and/or may have other embodiments in addition to or instead of the components listed above.

The client system 200 may be any one of the client systems 110, 114, 116, 118, 120, and/or handheld wireless device 122, a smartphone 124 or an IPAD® device 126 that may be utilized as one of the network devices of FIG. 1. In other embodiments, the client system 200 may include additional components and/or may not include all of the components listed above. The output system 202 may include any one of, some of, any combination of or all of a monitor system, a wireless transmitter, a handheld display system, a printer system, a speaker system, a connection or interface system to a sound system, an interface system to peripheral devices and/or a connection and/or an interface system to a computer system, an intranet, and/or the Internet.

The input system 204 may include any one of, some of, any combination of or all of a keyboard system, a mouse system, a track ball system, a track pad system, one or more buttons on a handheld system, a scanner system, a wireless receiver, a microphone system, a connection to a sound system, and/or a connection and/or an interface system to a computer system, an intranet, and/or the Internet (i.e., Infrared Data Association (IrDA), Universal Serial Bus or (USB)). The memory system 206 may include, any one of, some of, any combination of or all of a long-term storage system, such as a hard drive, a short term storage system, such as a random access memory; a removable storage system, such as a floppy drive or a removable drive, and/or a flash memory. The memory system 206 may include one or more machine readable mediums that may store a variety of different types of information. The term machine readable medium may be utilized to refer to any medium that may be structurally configured for carrying information in a format that may be readable by a machine. One example of a machine-readable medium may be a computer-readable medium. The memory system 206 may store a non-transitory storage media for improving hearing.

The processor system 208 may include any one of, some of, any combination of, or all of multiple parallel processors, a single processor, a system of processors having one or more central processors and/or one or more specialized processors dedicated to specific tasks. The processor system 208 may implement the programs stored in the memory system 206. The communications system 212 may communicatively link the output system 202, the input system 204, the memory system 206, the processor system 208, and/or the input/output system 214 to each other. The communications system 212 may include any one of, some of, any combination of, or all of one or more electrical cables, fiber optic cables, and/or means of sending signals through air or water (i.e., wireless communications), or the like. Some examples of means of sending signals through air and/or water may include systems for transmitting electromagnetic waves such as infrared and/or radio waves and/or systems for sending sound waves.

The input/output system 214 may include devices that have the dual function as input and output devices. For example, the input/output system 214 may include one or more touch sensitive screens, which display an image and therefore may be an output device and accept input when the screens may be pressed by a finger or a stylus. The touch sensitive screens may be sensitive to heat, capacitance and/or pressure. One or more of the input/output devices may be sensitive to a voltage or a current produced by a stylus. The input/output system 214 is optional, and may be utilized in addition to or in place of the output system 202 and/or the input device 204.

The client systems 110, 114, 116, 118, 120 and the handheld wireless device 122 may also be tied into a website 216 or a wireless portal 218 which may also be tied directly into the communications system 212. Any website 216 or wireless portal 218 may also include a non-transitory storage media and a website module (not shown) to maintain, allow access to and run the website as well.

Figure 29:
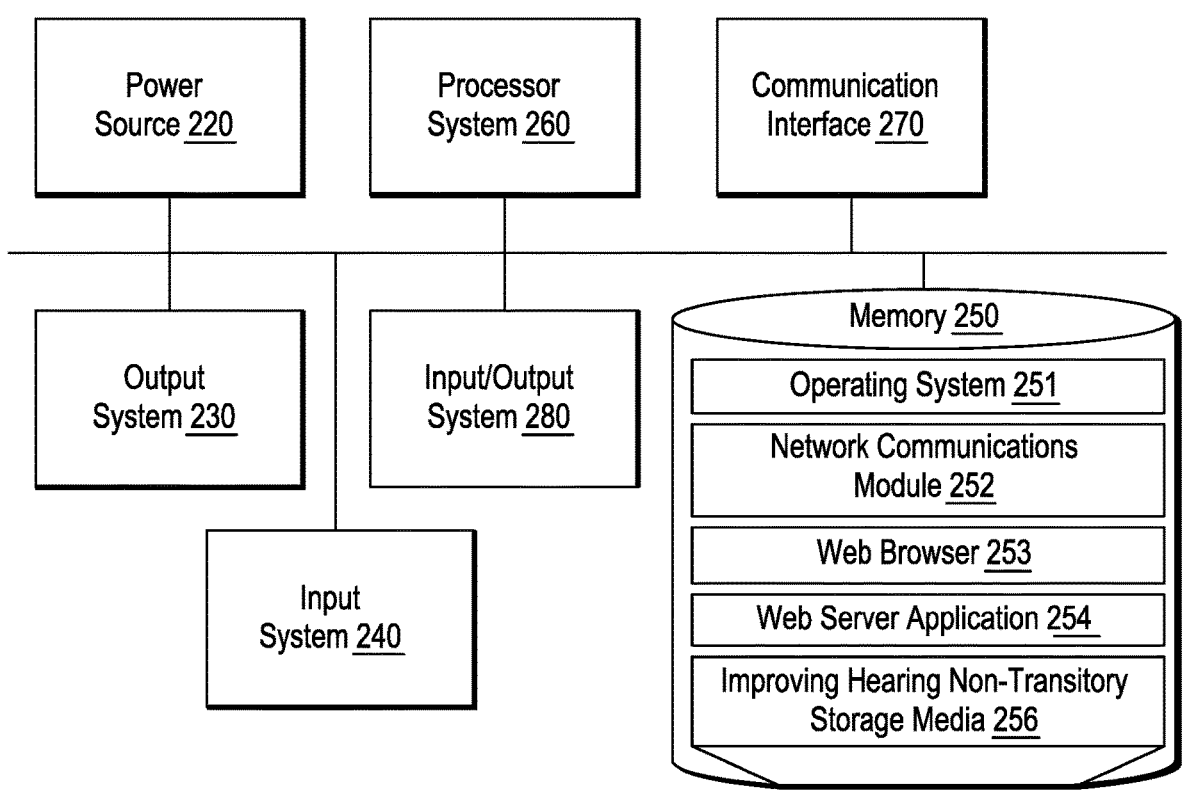
FIG. 29 illustrates a block diagram of a server system, in accordance with one embodiment of the present invention.

FIG. 29 illustrates a block diagram of a server system 104 that may be utilized for improving hearing. The server system 104 may include a power source 220, an output system 230, an input system 240, a memory system 250, which may store an operating system 251, a communications module 252, a web browser module 253, a web server application 254 and an improving hearing non-transitory storage media 256. The server system 104 may also include a processor system 260, a communications interface 270, a communications system 275 and an input/output system 280. In other embodiments, the server system 104 may include additional components and/or may not include all of the components listed above.

The output system 230 may include any one of, some of, any combination of, or all of a monitor system, a handheld display system, a printer system, a speaker system, a connection or interface system to a sound system, an interface system to one or more peripheral devices and/or a connection and/or interface system to a computer system, an intranet, and/or the Internet. The client system may perform at least one of gaze tracking, noise cancellation, analysis of gaze tracking, selection of microphone combination, noise cancellation and suppression, and sound amplification.

The input system 240 may include any one of, some of, any combination of, or all of a keyboard system, a mouse system, a track ball system, a track pad system, one or more buttons on a handheld system, a scanner system, a microphone system, a connection to a sound system, and/or a connection and/or an interface system to a computer system, an intranet, and/or the Internet (i.e., IrDA, USB).

The memory system 250 may include any one of, some of, any combination of, or all of a long term storage system, such as a hard drive; a short term storage system, such as random access memory; or a removable storage system, such as a floppy drive or a removable drive and/or a flash memory. The memory system 250 may include one or more machine readable mediums that may store a variety of different types of information. The term machine readable medium may be utilized to refer to any medium capable of carrying information that may be readable by a machine. One example of a machine-readable medium may be a computer-readable medium such as a non-transitory storage media. The memory system 250 may store one or more machine instructions for improving hearing. The operating system 251 may control all software and hardware of the system 100. The communications module 252 may enable the server system 104 to communicate on the communications network 112. The web browser module 253 may allow for browsing the Internet. The web server application 254 may serve a plurality of web pages to client systems that request the web pages, thereby facilitating browsing on the Internet. The improving hearing non-transitory storage media 256 may reside on the memory system 250. The processor system 260 may include any one of, some of, any combination of, or all of multiple parallel processors, a single processor, a system of processors having one or more central processors and/or one or more specialized processors dedicated to specific tasks. The processor system 260 may implement the machine instructions stored in the memory system 250.

In an alternative embodiment, the communication interface 270 may allow the server system 104 to interface with the communications network 112. In this embodiment, the output system 230 may send communications to the communication interface 270. The communications system 275 communicatively links the output system 230, the input system 240, the memory system 250, the processor system 260 and/or the input/output system 280 to each other. The communications system 275 may include any one of, some of, any combination of, or all of one or more electrical cables, fiber optic cables, and/or sending signals through air or water (i.e., wireless communications), or the like. Some examples of sending signals through air and/or water may include systems for transmitting electromagnetic waves such as infrared and/or radio waves and/or systems for sending sound waves.

The input/output system 280 may include devices that have the dual function as the input and output devices. For example, the input/output system 280 may include one or more touch sensitive screens, which display an image and therefore may be an output device and accept input when the screens may be pressed by a finger or a stylus. The touch sensitive screens may be sensitive to heat and/or pressure. One or more of the input/output devices may be sensitive to a voltage or a current produced by a stylus. The input/output system 280 may be optional and may be utilized in addition to or in place of the output system 230 and/or the input system 240.

While the present invention has been described in terms of the foregoing embodiments those skilled in the art will recognize that the invention is not limited to the embodiments described. The present invention may be practiced with modifications and alterations within the spirit and scope of the appended claims. Thus, the description is to be regarded as illustrative instead of restrictive on the present invention, and the invention is defined only by way of the appended claims.

The invention claimed is:

1. A system for improving hearing for a listening user when the listening user is at a location and the listening user's head is in a position and gaze orientation, comprising:
   a plurality of microphones to receive acoustic signals from outside an enclosure and to produce microphone output signals, the microphones arranged with at least three microphones in a triangular array at the periphery of the enclosure, the microphones being located on an extendable and retractable sliding extension piece which can slidably extend and retract from the enclosure, wherein the extension piece is slidably mounted on the underside of the enclosure and is in the form of a flat piece on which the three microphones are mounted in fixed position in a non-collinear relationship relative to each other and are exposed when a leading portion of the sliding piece extends from an edge of the enclosure and remain in their fixed relative position when extended;
   a user position processing circuit which receives information on the location of the listening user and computes the position of the listening user's head;

a processing circuit which receives the microphone output signals and information on the position of the listening user's head, enabling one or more of the plurality of microphones while disabling other microphones of the plurality to optimize reception of the acoustic signals received depending on the position of the listening user's head and produces audio output signals which are enhanced in acoustic sound quality relative to the acoustic signals received by the microphones; and an assistive hearing device to provide enhanced audio output signals to the listening user.

2. The system of claim 1, including:

a camera with a field of view to capture an optical image of the listening user's head; and wherein the user position processing circuit computes the gaze orientation of the listening user's head;

wherein the position and gaze orientation of the listening user's head is received by the processing circuit to optimize at least one of direction, strength, angle, and quality of the audio output signals.

3. The system of claim 1, wherein the plurality of microphones, user position processing circuit and audio transmitter are located in a device.

4. The system of claim 3, wherein the device is in the form of a smartphone.

5. The system of claim 1, wherein the plurality of microphones comprises beamforming microphones, and wherein the processing circuit executes a beamforming algorithm which defines a beam formation pattern of each of the plurality of beamforming microphone.

6. The system of claim 1, wherein the plurality of microphones comprises directional microphones.

7. The system of claim 1, wherein the array of microphones is contained in a device worn by the listening user.

8. The system of claim 7, wherein the device worn by the listening user is a smart watch.

9. The system of claim 1, including a sensor which detects gestures of the listening user and outputs control signals to control a characteristic of the audio output signals.

10. The system of claim 9, wherein the sensor detects whether the listening user has a prolonged gaze gesture, and wherein a detection of the prolonged gaze gesture activates a notification to the listening user.

11. The system of claim 9, wherein the characteristic is volume of the audio output signals.

12. The system of claim 9, wherein the characteristic is a delayed output of the audio signals.

13. The system of claim 1, further including a head set, and wherein the head set includes at least one of the plurality of microphones and a sensor to detect head movement and position.

14. The system of claim 13, wherein the sensor and the plurality of microphones are combined and in the form of eye glasses.

15. The system of claim 13, wherein the head set includes both a sensor to detect head movement and a sensor to detect position and the plurality of microphones.

16. The system in claim 15, wherein the headset is selected from the group consisting of an earbud, earphones, hearing aids, assistive hearing devices, BLUETOOTH® headsets, cochlear implants, headphones, and other device used to hear or enhance hearing.

17. The system of claim 1, further including sensors to detect tracking of head position.

18. The system of claim 16, wherein the sensors comprise a gyroscope and accelerometer.

19. The system of claim 1, wherein the assistive hearing device comprises at least one of audio speakers, a wireless equipped hearing aid, Bluetooth headset, earbuds, headphones, bone conduction hearing device and cochlear implants.

20. The system of claim 1, wherein the assistive hearing device is an earbud, and wherein the earbud has an EEG sensor and wherein the audio output is in response to the EEG sensor output.

21. The system of claim 20, wherein the audio output in response to the EEG sensor output is a notification.

22. The system of claim 1, wherein the processing circuit comprises an amplifier to amplify the microphone output signals.

23. The system of claim 1, further including an audio transmitter to transmit the audio output signals to the assistive hearing device.

24. The system of claim 19, further including an audio transmitter to transmit the audio output signals to the assistive hearing device.

25. The system of claim 1, wherein the plurality of microphones and processing circuit is in the form of a conference puck having webcams incorporated in an enclosure and conference telephone call and video conferencing capability.

26. The system of claim 25, wherein the conference puck includes a webcam which detects the location of the listening user and active speaker.

27. The system of claim 1, wherein the system is housed in an enclosure having a kickstand to enable use as a handheld device or erected to stand upon a surface.

28. The system of claim 1, including parametric speakers adapted to be directed at the listening user's ears.

29. The system of claim 3, wherein the device includes a mirror adapted to point at the listening user's head so that the device can lay flat on a horizontal surface.

30. The system of claim 3, wherein the device comprises at least one of an electronic tablet and a body worn device.

31. The system of claim 1, further including an audio storage medium for storing the audio output signals for delayed or repeated playback.

32. The system of claim 1, including a sensor which detects actions of the listening user and controls at least one audio characteristic of the audio output signals in response.

33. The system of claim 26, wherein the audio characteristics include audio playing of additional notifications.

34. The system of claim 32, wherein the sensor detects at least one of eye movement, EEG activity, head position, or listening user touch.

35. The system of claim 30, wherein the audio characteristics comprise audio volume.

36. The system of claim 3, wherein the device includes a power recharging circuit.

37. The system of claim 36, wherein the device includes a storage location and recharge port for storing and charging an earbud.

38. The system of claim 3, wherein the device is in the form of a sound puck.

39. The system according to claim 3, wherein the device has a case which includes absorptive foam to acoustically decouple microphones from the case.

40. The system according to claim 1, wherein the system includes eyeglasses to be worn by the listening user, the eyeglasses including a microprojector for projecting an optical image onto the listening user's eyeglasses to be seen by the listening user.

41. The system according to claim 40, wherein the eyeglasses include a beamsplitter.

42. The system for improving hearing according to claim 1, further including:
- a computer system with a processor system, a communications interface, a communications system, an input system and an output system, the computer system having access to a communications network;
- a memory system with an operating system, a communications module, a processor and an improving hearing non-transitory storage medium for storing applications software for processing information representing audio signals obtained from a plurality of microphones to enhance the sound quality of the audio signals, and,
- wherein the output system and communication module transmit the enhanced audio signals to the listening user.

43. The system according to claim 42, further comprising a client system, wherein the client system accesses the server system via the communications network.

44. The system according to claim 43, wherein the client system performs at least one of gaze tracking, noise cancellation, analysis of gaze tracking, selection of microphone combination, noise cancellation and suppression, and sound amplification.

45. The system according to claim 43, wherein the client system comprises a sound puck having a casing, an input socket, an output socket, at least one speaker and a second indicator light having a transparent battery indicia.

46. The system according to claim 43, wherein the client system comprises a smartphone holder having a base attachment piece, a smartphone attachment piece and a smartphone.

47. The system according to claim 46, wherein the smartphone attachment piece is coupled to the base attachment piece by inserting a centered attachment aperture with four equidistant attachment tabs into an aligned raised centered coupling and four equidistance indentations and twisting the smartphone coupled to the smartphone attachment piece, thereby securing the coupled smartphone in place.

48. The system according to claim 44, wherein the smartphone includes at least one camera to acquire video of the listening user within video capability of the smartphone.

49. The system according to claim 37, further including earbuds with sensors to detect head position of the listening user.

50. The system according to claim 4, wherein the smartphone includes a sound recording applications program that acquires sounds of the listening user within audio capability of the smartphone.

51. A method for improving hearing for a listening user, comprising the steps of:
- holding a smartphone having a camera in a location that allows the listening user with the smartphone to detect location of the listening user;
- obtaining audio signals with a plurality of beamformer microphones in the smartphone, wherein the microphones are arranged with at least three microphones in a triangular array at the periphery of the smartphone, the microphones being located on an extendable and retractable sliding extension piece which can slidably extend and retract from the smartphone, wherein the extension piece is slidably mounted on the underside of the smartphone and is in the form of a flat piece on which the three microphones are mounted in fixed position in a non-collinear relationship relative to each other and are exposed when a leading portion of the sliding piece extends from an edge of the smartphone and remain in their fixed relative position when extended; and
- feeding back hearing information to the listening user with enhanced audio signals processed from at least one of the plurality of beamformer microphones using a beamformer algorithm that defines an angle and strength of the beamformer microphones, and enabling one or more of the plurality of the beamformer microphones while disabling other beamformer microphones of the plurality to optimize reception of the audio signals received depending on the position of the listening user's head.

52. The method for improving hearing according to claim 51, including using a plurality of cameras are utilized to determine head position and gaze of the listening user.

53. The method for improving hearing according to claim 51, including using earbuds with sensors to detect head position of the listening user.

54. The method for improving hearing according to claim 51, wherein the enhanced audio signals are outputted with a device selected from the group consisting of at least one external speaker, one or more at least one external parametric speaker, the smartphone with or without at least one ear bud, a hearing aid, an assistive hearing device, a Bluetooth headset, a cochlear implant, bone conduction hearing device, and a set of headphones.

55. The method for improving hearing, according to claim 51, wherein the step of feeding back hearing information includes at least one of noise cancellation, analysis of gaze tracking, selection of microphone combination and sound amplification.

56. A non-transitory computer storage media having instructions stored thereon which, when executed, execute a method to provide enhanced audio signals to a listening user comprising the steps of:
- receiving audio signals with a plurality of beamformer microphones in a smartphone, wherein the microphones are arranged with at least three microphones arranged in a triangular array at the periphery of the smartphone, the microphones being located on an extendable and retractable sliding extension piece which can slidably extend and retract from the smartphone, wherein the extension piece is slidably mounted on the underside of the smartphone and is in the form of a flat piece on which the three microphones are mounted in fixed position in a non-collinear relationship relative to each other and are exposed when a leading portion of the sliding piece extends from an edge of the smartphone and remain in their fixed relative position when extended;
- monitoring the position of the listening user with the smartphone with a camera that is in focus to allow for viewing of the listening user; and
- feeding back hearing information to the listening user with enhanced audio signals processed using the plurality of the beamformer microphones, enabling one or more of the plurality of beamformer microphones while disabling other beamformer microphones of the plurality to optimize reception of the acoustic signals received depending on the position of the listening user's head.

57. The non-transitory computer storage media, according to claim 56, wherein a plurality of cameras are utilized to determine head position and gaze of the listening user.

58. The non-transitory computer storage media, according to claim 56, wherein the enhanced audio signals are outputted with a device selected from the group consisting of at least one external speakers, at least one or more external parametric speaker, the smartphone with or without at least one ear bud, a hearing aid, an assistive hearing device, a Bluetooth headset, a cochlear implant, and a set of headphones.

59. The non-transitory computer storage media, according to claim 56, wherein the step of feeding back hearing information includes at least one of noise cancellation, analysis of gaze tracking, selection of microphone combination and sound amplification.

60. A system for improving hearing of a listening user from a human voice, comprising:
   a smartphone with a camera to detect the location of the listening user;
   a plurality of beamformer microphones arranged with at least three microphones in a triangular array at the periphery of the smartphone for obtaining audio signals, the microphones being located on an extendable and retractable sliding extension piece which can slidably extend and retract from the smartphone, wherein the extension piece is slidably mounted on the underside of the smartphone and is in the form of a flat piece on which the three microphones are mounted in fixed position in a non-collinear relationship relative to each other and are exposed when a leading portion of the sliding piece extends from an edge of the smartphone device and remain in their fixed relative position when extended, wherein a characteristic angle and strength of a beamformer microphone are definable by a beamformer algorithm; and
   the smartphone having a circuit which enhances audio signals from at least one of the beamformer microphones using a beamformer algorithm that defines the characteristic angle and strength of the beamformer microphones, and outputs the enhanced audio signals to the listening user, enabling one or more of the plurality of beamformer microphones while disabling other beamformer microphones of the plurality to optimize reception of the acoustic signals received depending on the position of the listening user's head;
   wherein the plurality of beamformer microphones is selected from the group consisting of a microphone array, a sound puck, a conference pack and a smartphone.

61. A method for improving hearing for a listening user, comprising the steps of:
   holding a smartphone having a camera in a location that allows the listening user with the smartphone to detect location of the listening user;
   obtaining audio signals with a plurality of beamformer microphones arranged with at least three microphones in a triangular array at the periphery of the smartphone, the microphones being located on an extendable and retractable sliding extension piece which can slidably extend and retract from the smartphone, wherein the extension piece is slidably mounted on the underside of the smartphone and is in the form of a flat piece on which the three microphones are mounted in fixed position in a non-collinear relationship relative to each other and are exposed when a leading portion of the sliding piece extends from an edge of the smartphone and remain in their fixed relative position when extended; and
   feeding back hearing information to the listening user with enhanced audio signals processed from at least one of the plurality of beamformer microphones using a beamformer algorithm that defines an angle and strength of the beamformer microphones, and enabling one or more of the plurality of beamformer microphones while disabling other beamformer microphones of the plurality to optimize reception of the acoustic signals received depending on the position of the listening user's head.

62. The system of claim 1, wherein the audio processing circuit outputs audio signals tuned to a hearing deficit profile of the listening user.

* * * * *